US010796403B2

(12) United States Patent
Choi et al.

(10) Patent No.: US 10,796,403 B2
(45) Date of Patent: Oct. 6, 2020

(54) THERMAL-DEPTH FUSION IMAGING

(71) Applicant: The Regents of the University of Colorado, a body corporate, Denver, CO (US)

(72) Inventors: Min-Hyung Choi, Superior, CO (US); Shane Transue, Arvada, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 16/131,659

(22) Filed: Sep. 14, 2018

(65) Prior Publication Data

US 2019/0080431 A1  Mar. 14, 2019

Related U.S. Application Data

(60) Provisional application No. 62/558,721, filed on Sep. 14, 2017.

(51) Int. Cl.
*G06T 3/00* (2006.01)
*G06T 5/00* (2006.01)
(Continued)

(52) U.S. Cl.
CPC ........ *G06T 3/0081* (2013.01); *G06K 9/00255* (2013.01); *G06K 9/00288* (2013.01);
(Continued)

(58) Field of Classification Search
CPC ......... G06T 3/0081; G06T 5/50; G06T 5/006; G06T 2207/20081; G06T 2207/20221; G06T 2207/10048; G06T 2207/10028; G06T 2207/30201; G06K 9/6289; G06K 9/00288; G06K 9/00255; G06K 9/209
(Continued)

(56) References Cited

U.S. PATENT DOCUMENTS 9,685,065 B2 * 6/2017 Diels .................... G08B 21/043
2015/0062558 A1 * 3/2015 Koppal .................. G01S 17/89
356/5.01
(Continued)

FOREIGN PATENT DOCUMENTS

KR    10-1785202 B1    10/2017

OTHER PUBLICATIONS

Rangel, "3D Thermal Imaging: Fusion of Thermography and Depth Cameras" 2014.*
(Continued)

*Primary Examiner* — Juan A Torres

(57) ABSTRACT

An imaging system is provided. The imaging system includes a 3D image capture device, which is configured to capture a depth image of an object, and a thermal image capture device, which is configured to capture a thermal image of the object. The imaging system also includes a processing system, which is coupled with the 3D image capture device and the thermal image capture device. The processing system is configured to process the depth image and the thermal image to produce a thermal-depth fusion image by aligning the thermal image with the depth image, and assigning a thermal value derived from the thermal image to a plurality of points of the depth image.

20 Claims, 16 Drawing Sheets

(51) Int. Cl.
| | |
|---|---|
| *G06T 5/50* | (2006.01) |
| *G06K 9/00* | (2006.01) |
| *G06K 9/62* | (2006.01) |
| *G06K 9/20* | (2006.01) |

(52) U.S. Cl.
CPC ............ *G06K 9/6289* (2013.01); *G06T 5/006* (2013.01); *G06T 5/50* (2013.01); *G06K 9/209* (2013.01); *G06T 2207/10028* (2013.01); *G06T 2207/10048* (2013.01); *G06T 2207/20081* (2013.01); *G06T 2207/20221* (2013.01); *G06T 2207/30201* (2013.01)

(58) Field of Classification Search
USPC .......................................................... 382/118
See application file for complete search history.

(56) References Cited

U.S. PATENT DOCUMENTS

| | | | | |
|---|---|---|---|---|
| 2016/0140390 | A1* | 5/2016 | Ghosh | G06K 9/00597 348/78 |
| 2018/0005021 | A1* | 1/2018 | Young | G06K 9/00288 |
| 2019/0020803 | A1* | 1/2019 | Chen | G03B 15/05 |
| 2019/0302963 | A1* | 10/2019 | Harrison | G06F 3/0418 |

OTHER PUBLICATIONS

Transue, "Thermal-Depth Fusion for Occluded Body Skeletal Posture Estimation" 2017 IEEE/ACM International Conference on Connected Health: Applications, Systems and Engineering Technologies (CHASE) Jul. 17, 2017.*

Lee, "3D mapping of surface temperature using thermal stereo," in 9th International Conference on Control, Automation, Robotics and Vision, Singapore, 2006, pp. 1-4.*

Lussier, Jake T. et al., "Automatic Calibration of RGBD and Thermal Cameras," IEEE/RSJ International Conference on Intelligent Robots and Systems, pp. 451-458, Sep. 14-18, 2014.

van Baar, Jeroen et al., "Sensor Fusion for Depth Estimation, Including TOF and Thermal Sensors," Second Joint 3DIM/3DPVT Conference: 3D Imaging, Modeling, Processing, Visualization & Transmission, pp. 472-478, 2012.

Vidas, Stephen et al., "3D Thermal Mapping of Building Interiors Using an RGB-D and Thermal Camera," IEEE International Conference on Robotics and Automation, 9 pages, May 2013.

Weinmann, Martin et al., "Thermal 3D Mapping for Object Detection in Dynamic Scenes," ISPRS Technical Commission I Symposium, pp. 53-60, Nov. 17-20, 2014.

* cited by examiner

Depth Point-cloud 1000  Thermal Point-cloud 1010

Limited-resolution IR-Depth 1020   High-resolution Thermal 1030   Thermal-depth Fusion 1040

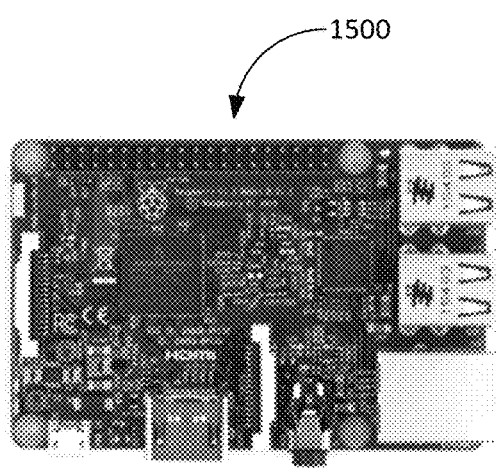
Raspberry Pi
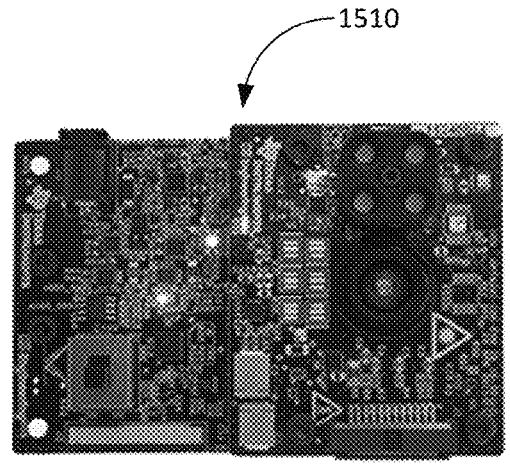
Texas Ins. OPT8241 (depth)
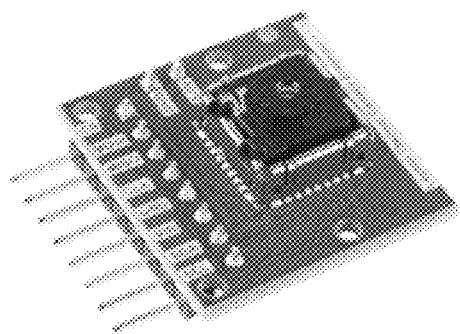
Flir Lepton (thermal)
Sony CLM-V55 LCD
FIGURE 15

THERMAL-DEPTH FUSION IMAGING

RELATED APPLICATIONS

This application hereby claims the benefit of and priority to U.S. Provisional Patent Application No. 62/558,721, titled "THERMAL-DEPTH FUSION FOR VOLUMETRIC 3D IMAGING", filed on Sep. 14, 2017 and which is hereby incorporated by reference in its entirety.

TECHNICAL FIELD

Aspects of the disclosure are related to digital imaging and recognition of objects.

TECHNICAL BACKGROUND

Thermal-depth fusion has been explored within a variety of computer vision applications including motion tracking, environmental modeling, and scan-based 3D reconstruction methods. This research direction has also received sporadic research attention in both basic functional operations on two-dimensional images and visualization of thermal distributions within 3D point-clouds. Based on these contributions, the vast majority of thermal-depth fusion research has been directed at using thermal imaging as a segmentation prior that drastically reduces the ambiguity of identifying human figures, thermal-mapping Simultaneous Localization And Mapping (SLAM) aligned point-clouds, and adapting computer vision techniques for thermal reconstructions of interior spaces such as those illustrated within FIGS. 4A-4C.

These research directions illustrate how the combination of various sensing modalities can be effectively used to gain more information about real-world conditions and interactions based on the process of superimposing thermal data on depth images and 3D point-clouds. Current state-of-the art methods illustrate how this fusion process has been utilized for generalized human segmentation and thermal point-cloud reconstruction of various environments. However, the potential of these methods does not address the implications of building meaningful merged datasets from individual modalities.

Overview

In an embodiment, an imaging system is provided. The imaging system includes a 3D image capture device, which is configured to capture a depth image of an object, and a thermal image capture device, which is configured to capture a thermal image of the object.

The imaging system also includes a processing system, which is coupled with the 3D image capture device and the thermal image capture device. The processing system is configured to process the depth image and the thermal image to produce a thermal-depth fusion image by aligning the thermal image with the depth image, and assigning a thermal value derived from the thermal image to a plurality of points of the depth image.

In another embodiment, a method of operating an imaging system is provided. The method includes receiving a depth image of an object from a 3D image capture device, and receiving a thermal image of the object from a thermal image capture device.

The method also includes aligning the thermal image with the depth image, and producing a thermal-depth fusion image by assigning a thermal value derived from the thermal image to a plurality of points of the depth image.

In a further embodiment, an imaging system is provided. The imaging system includes a 3D image capture device, which is configured to capture a depth image of an object, and a thermal image capture device, which is configured to capture a thermal image of the object.

The imaging system also includes a processing system, which is coupled with the 3D image capture device and the thermal image capture device. The processing system is configured to process the depth image and the thermal image to produce a thermal-depth fusion image by aligning the thermal image with the depth image using a machine-learning process wherein localized deformation is iteratively applied to dense transformation estimates minimizing deformation error until convergence to produce a geometric transformation of the thermal image to match the depth image, wherein the machine-learning process includes per-pixel transformations established during an initial training process, and assigning a thermal value derived from the thermal image to a plurality of points of the depth image.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 15 illustrates exemplary embedded device components for thermal-depth fusion based on currently available and compatible devices.

DETAILED DESCRIPTION

Figure 1:
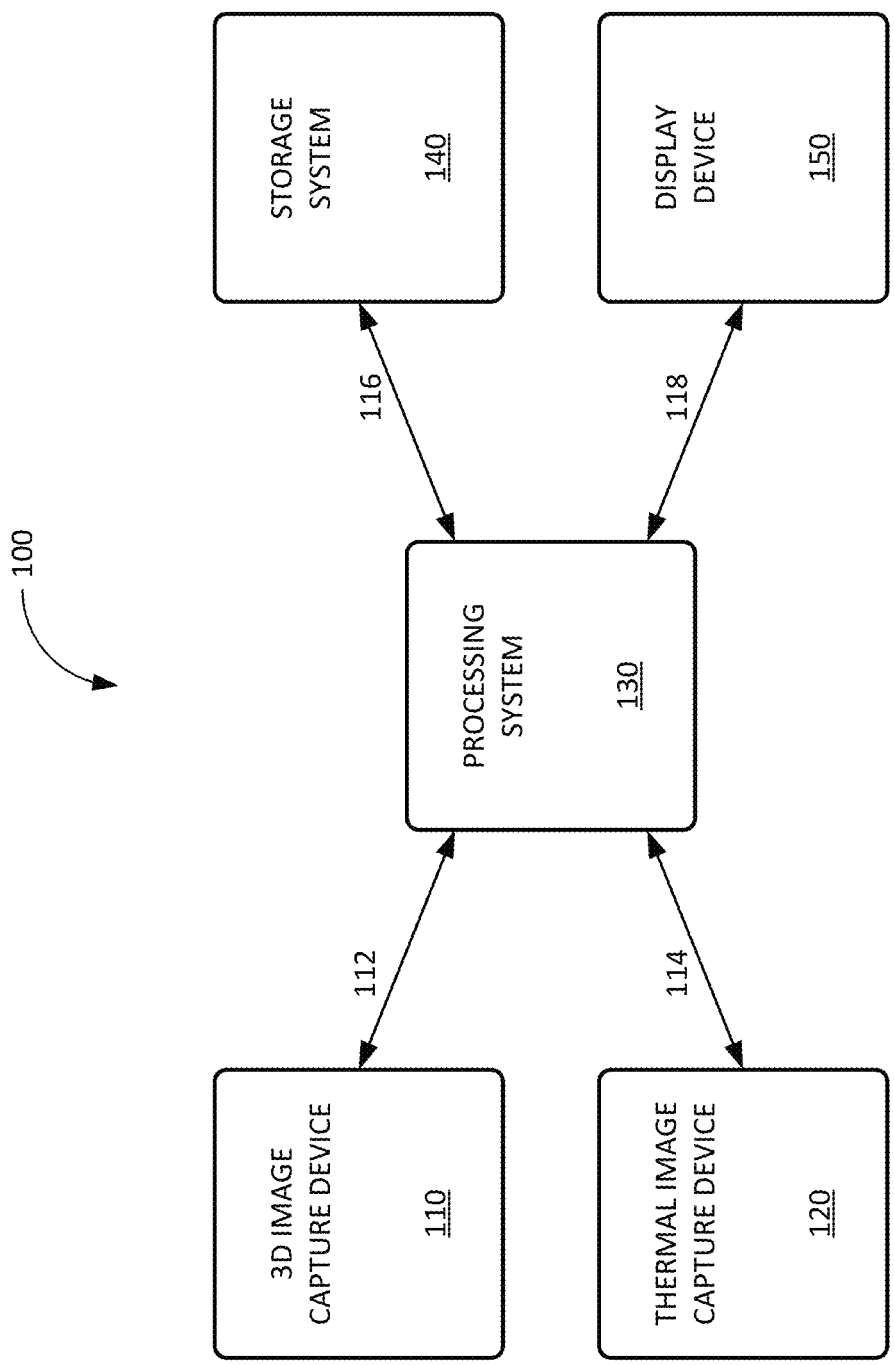
FIG. 1 illustrates an image capture system.

FIG. 1 illustrates imaging system 100. In this example embodiment, 3D image capture device 110 and thermal image capture device 120, send image data to, and receive commands from, processing system 130 through links 112 and 114 respectively. In some example embodiments, 3D image capture device 110 comprises two or more digital image capture devices in a stereo configuration, or alternatively, a time-of-flight depth imaging system, or the like. Processing system 130 fuses 3D images from 3D image capture device 110 with thermal images from thermal image capture device 120 to create thermal-depth fusion images which then may be stored in storage system 140 or displayed on display device 150. Processing system 130 communicates with storage system 140 over link 116 and with display device 150 over link 118.

Processing system 130 is configured to create thermal-depth fusion images which may be used for a variety of purposes. In one example, processing system 130 is configured to create a thermal-depth fusion image of a human face, which is then compared to a plurality of previously recorded thermal-depth fusion images of human faces stored in storage system 140. When a match is found, processing system 130 then determines an identity of the human face based on the matching thermal-depth fusion image.

Processing system 130 may take any of a variety of configurations. In some examples, processing system 130 may be a Field Programmable Gate Array (FPGA) with software, software with a memory buffer, an Application Specific Integrated Circuit (ASIC), a set of Hardware Description Language (HDL) commands, such as Verilog or System Verilog, used to create an ASIC, or any of many other possible configurations.

3D image capture device 110, thermal image capture device 120, storage system 140, and display device 150 communicate with processing system 130 over various communication links, such as communication links 112, 114, 116, and 118. These communication links may use the Internet or other global communication networks. Each communication link may comprise one or more wireless links that can each further include Long Term Evolution (LTE), Global System for Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. These communication links can carry any communication protocol suitable for wireless communications, such as Internet Protocol (IP) or Ethernet.

Additionally, communication links can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Communication links can each use metal, glass, optical, air, space, or some other material as the transport media. Communication links may each be a direct link, or may include intermediate networks, systems, or devices, and may include a logical network link transported over multiple physical links. Common storage links include SAS, SATA, NVMe, Ethernet, Fiber Channel, Infiniband, and the like.

Figure 2:
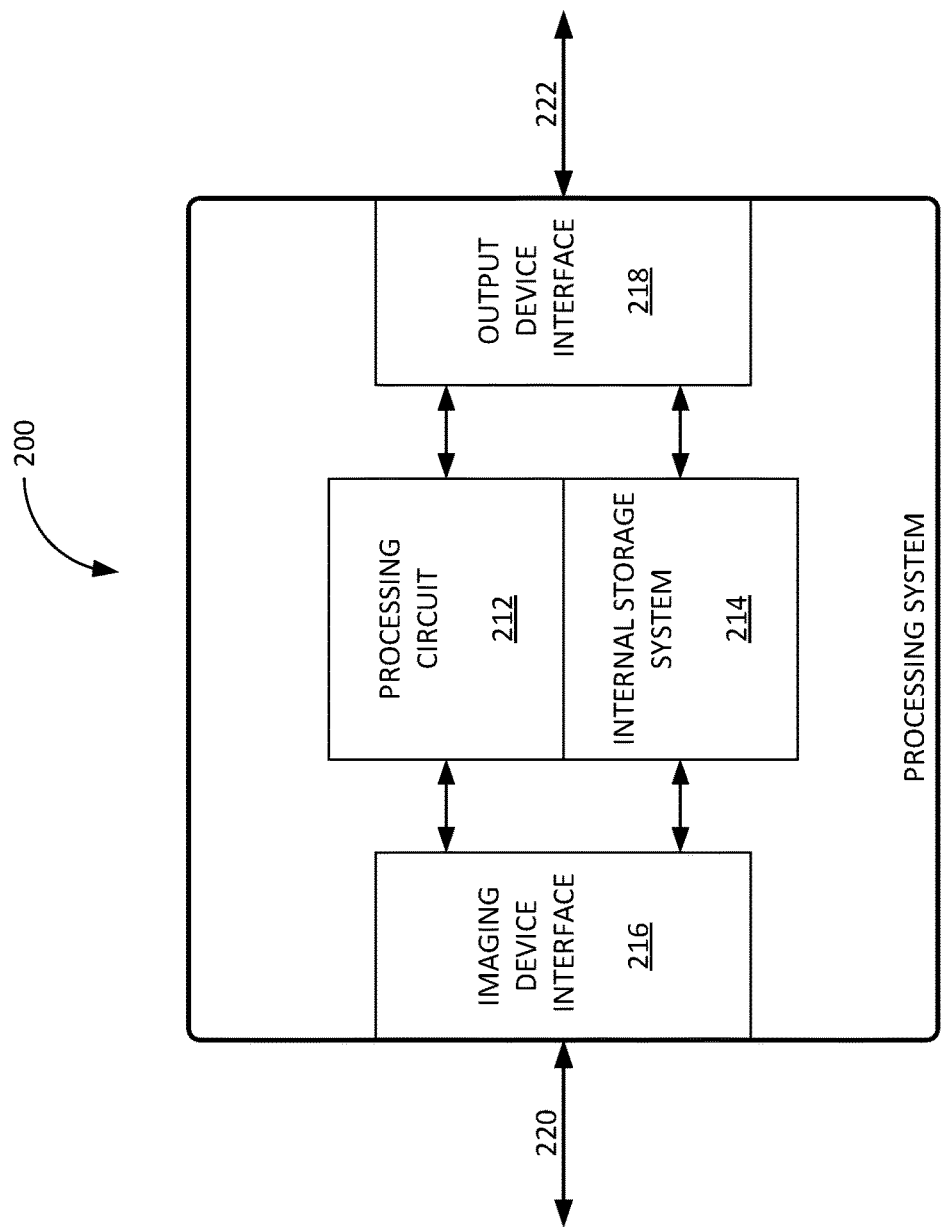
FIG. 2 illustrates a processing system within an image capture system.

FIG. 2 illustrates processing system 200, such as processing system 130 from FIG. 1, within an image capture system 100 such as that illustrated in FIG. 1. In this example embodiment, processing system 200 includes processing circuit 212, internal storage system 214, imaging device interface 216, and output device interface 218.

Processing system 200 may be implemented in any of a wide variety of ways, including single board computers (such as the RASPBERRY PI), ASICs, laptop computers, desktop computers, and the like. Imaging device interface 216 is configured to communicate with a variety of image capture devices over communication link 220. Output device interface 218 is configured to communicate with a wide variety of output and storage devices over communication link 222.

Internal storage system 214 may contain both software and data. The software may include program instructions directing the operation of processing circuit 212. The data may include temporary data storage associated with processing circuit 212, and may also contain data used by the software to direct the operation of processing circuit 212, and the like.

The present invention presents a new way to integrate two different modalities, thermal and 3D depth images into an aggregated multi-modal image. Based on this method, a new method for synthesizing biometric facial thermal-depth images for authentication is introduced. Synthesized biometrics for authentication derives unique authentication signatures of an individual based on the combination of thermal and depth images to extract harmonic relations between curvature, thermal distributions, and facial structure. New techniques introduce a multi-modal image fusion (the alignment and integration of multiple images) beyond simple data aggregations to formulate new synergies between thermal and depth imaging for new modeling methodologies within computer vision, mobile computing, scientific visualization, and authentication.

Recent thermal fusion research has reached an impasse due to a saturation of methods that perform simple data alignments between depth and thermal imaging devices. Based on the rapid development of both depth and thermal imaging devices, this core concept initiates the process of fusing multiple imaging modalities, but fails to provide new methodologies within authentication that are robust, work in all environmental conditions, and are user friendly.

Through the introduction of synthesized biometric authentication derived from thermal-depth fusion, the present invention integrates computer vision, classification, and medical imaging to provide a novel contribution above current authentication methodologies. Exploring the relational fusion between depth and thermal imaging has the potential to provide a new foundation for how these integrated modalities can be used to extract implicit relationships between physical properties of an individual's face and its structure.

Towards the realization of the relational synergy between depth and thermal imaging fusion, the present invention provides three primary contributions: (1) a novel method for fusing multiple image modalities generated by devices with distinct hardware configurations, optics, and data representations through Machine Learning (ML), (2) a method for formalizing the unique thermal biometric signature of an individual's face based on the synthesis of curvature and thermal distributions, and (3) a structured hierarchy of 3D thermal signatures that can be utilized for low resolution devices, imperfect environmental conditions, and partial occlusions.

Figure 3:
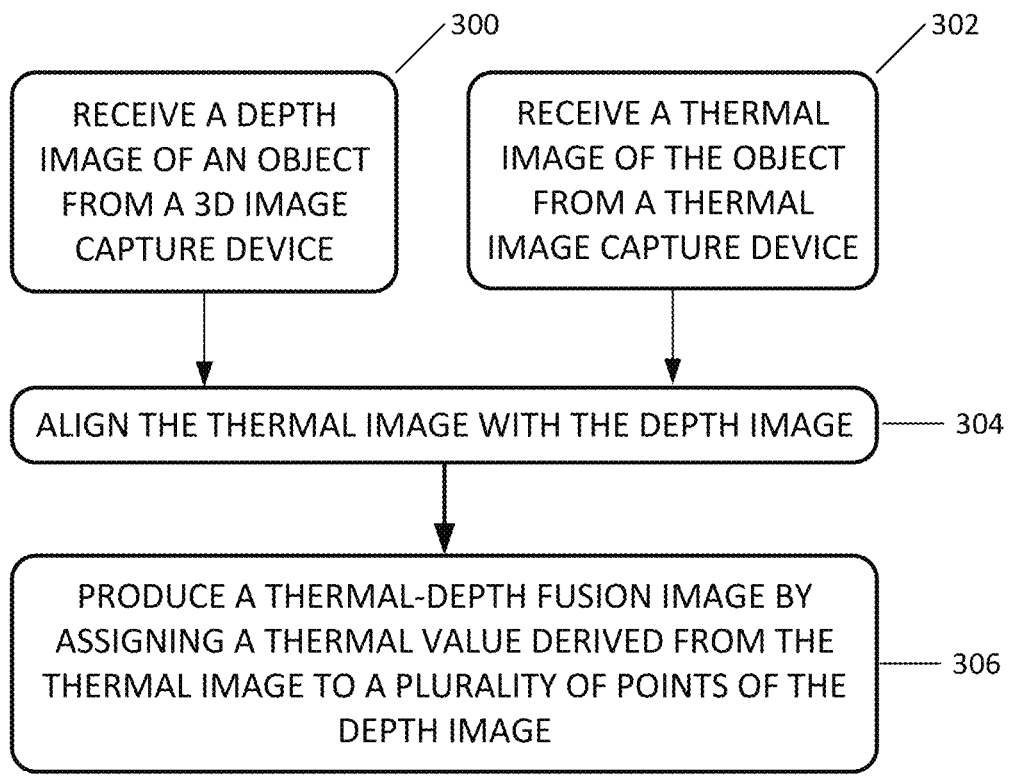
FIG. 3 illustrates a method of operating an image capture system.

FIG. 3 illustrates an example method of operating an imaging system according to the present invention. Processing system 130 receives a depth image of an object from 3D image capture device 110, (operation 300). In some embodiments, the depth image is a two-dimensional array of data with a depth or distance value included in each cell of the array. Processing system 130 also receives a thermal image of the object from thermal image capture device 120, (operation 302). In some embodiments, the thermal image is a two-dimensional array of data with a temperature value included in each cell of the array. Note that within the scope of the present invention, operations 300 and 302 may be performed in any order, or may be performed simultaneously.

Processing system 130 aligns the thermal image with the depth image, (operation 304). This alignment may be performed by processing system 130 in any of a variety of methods. In one example method, processing system 130 utilizes a machine-learning process wherein localized deformation is iteratively applied to dense transformation estimates minimizing deformation error until convergence to produce a geometric transformation of the thermal image to match the depth image. In another example method the machine-learning process includes per-pixel transformations established during an initial training process.

Processing system 130 produces a thermal-depth fusion image by assigning a thermal value derived from the thermal image to a plurality of points of the depth image, (operation 306). Since current thermal image capture devices provide much less resolution than current image capture devices, the thermal value for the points in the depth image may need to be interpolated or otherwise calculated from the thermal image once it is aligned with the depth image.

Figure 4A:
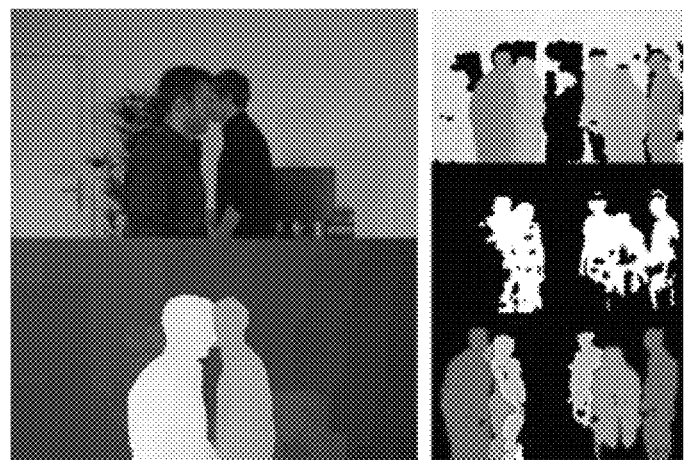
FIG. 4A illustrates a prior art example of human segmentation with depth and thermal mapping.
Figure 4B:
FIG. 4B illustrates a prior art example of 6D SLAM-based exterior thermal mapping.
Figure 4C:
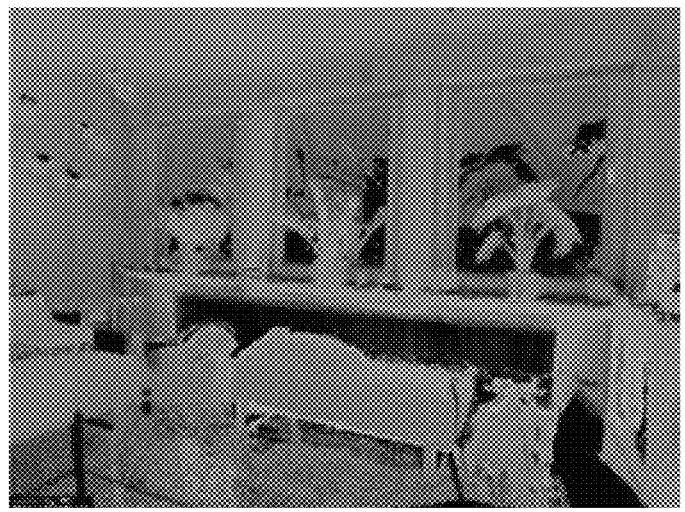
FIG. 4C illustrates a prior art example of interior and object thermal imaging for dense point-clouds.

FIG. 4A illustrates a prior art example of human segmentation with depth and thermal mapping. FIG. 4B illustrates a prior art example of 6D SLAM-based exterior thermal mapping. FIG. 4C illustrates a prior art example of interior and object thermal imaging for dense point-clouds.

Many of these recent thermal-depth fusion techniques have explored the basic operations required for pairing multiple imaging devices to superimpose various spectral images to consolidate the data introduced by different image modalities. These approaches are commonly based on the stereoscopic imaging calibration technique originally introduced to estimate camera intrinsic properties for generating binocular disparity maps, 3D images using stereoscopy, and image registration based on simple checker-board calibrations.

This approach has been extended to the fusion concept to combine image types from various devices for generating multi-modal images and point-clouds using both color and depth data. This has provided the foundation for several color and depth imaging applications including those used within the multitude of commercially available scanning and 3D imaging devices. Recent techniques utilizing depth and thermal imaging have begun to use this template-based calibration process for fusing multiple modalities into aggregated depth images and 3D point-clouds for various applications.

Figure 5A:
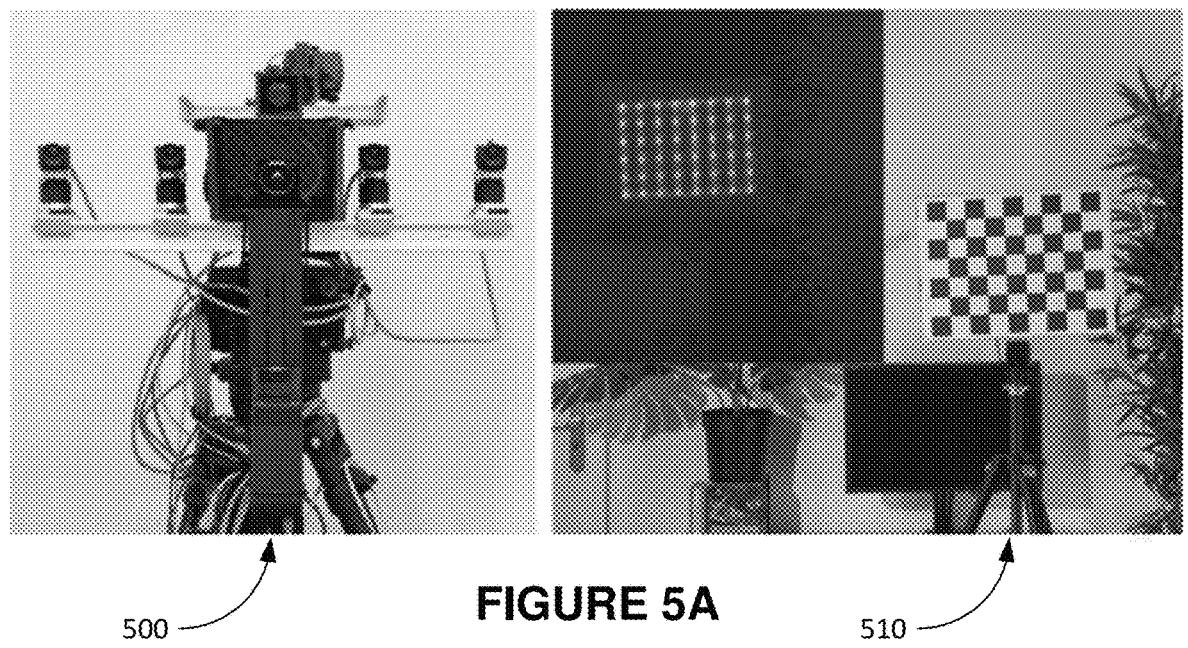
FIGS. 5A and 5B illustrate an example thermal-depth fusion device prototype and configuration process based on standard stereoscopic image calibration using checkered pattern images (templates) with embedded thermal markers.
Figure 5B:
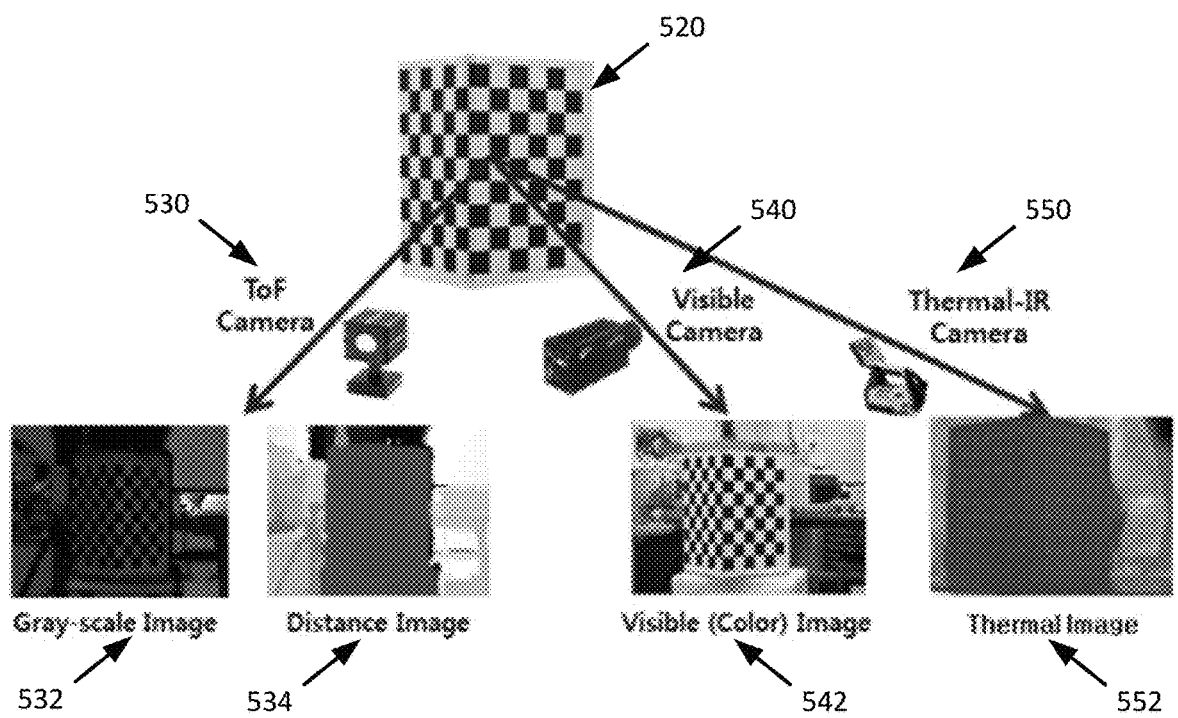

FIGS. 5A and 5B illustrate an example thermal-depth fusion device prototype and configuration processes based on standard stereoscopic image calibration using checkered pattern images (templates) with embedded thermal markers.

FIG. 5A illustrates an example embodiment of an imaging system 500 configured to produce thermal-depth fusion images, and an example embodiment of checkered patterns including embedded thermal markers 510.

FIG. 5B illustrates how each element of the example imaging system 500 produces image data used by a processing system to produce thermal-depth fusion images. In this example embodiment, time-of-flight camera 530 produces a gray-scale image 532 and a distance image 534 of target 520. Visible camera 540 produces a visible (color) image 542 of target 520, and thermal-IR camera 550 produces a thermal image 552 of target 520.

Figure 6A:
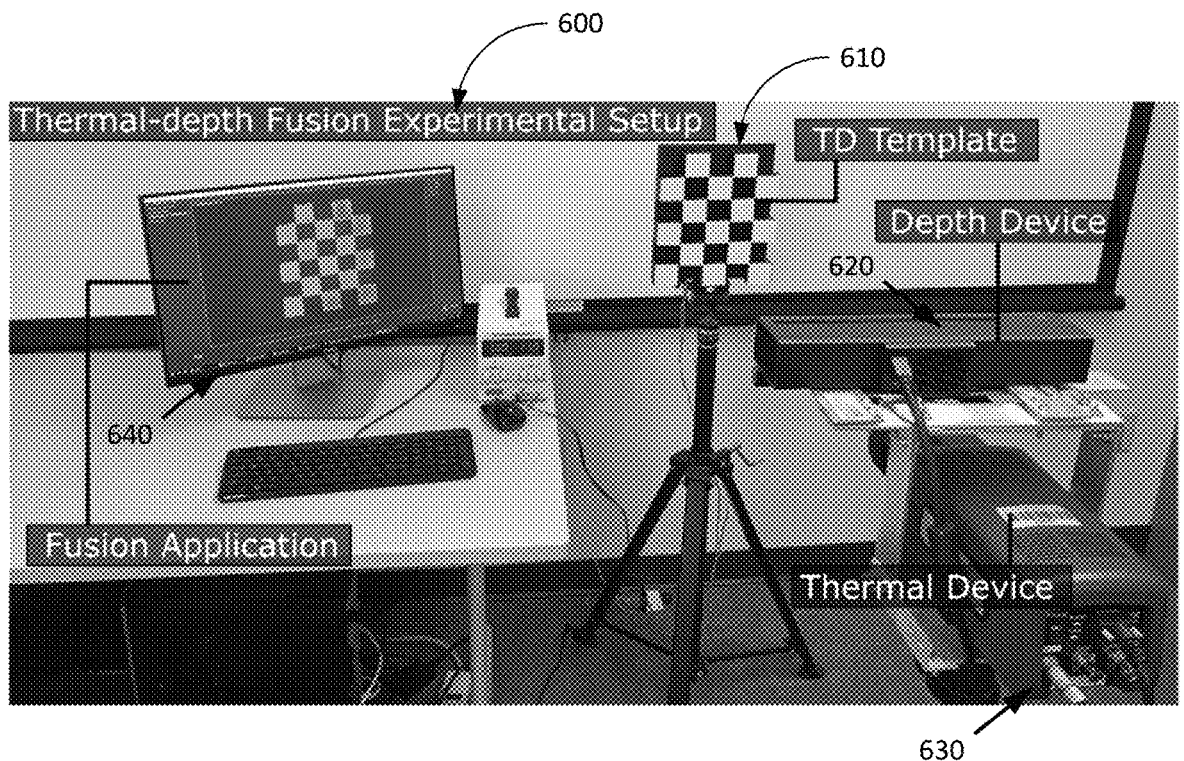
FIGS. 6A and 6B illustrate an example of a thermal-depth fusion experimental setup.
Figure 6B:
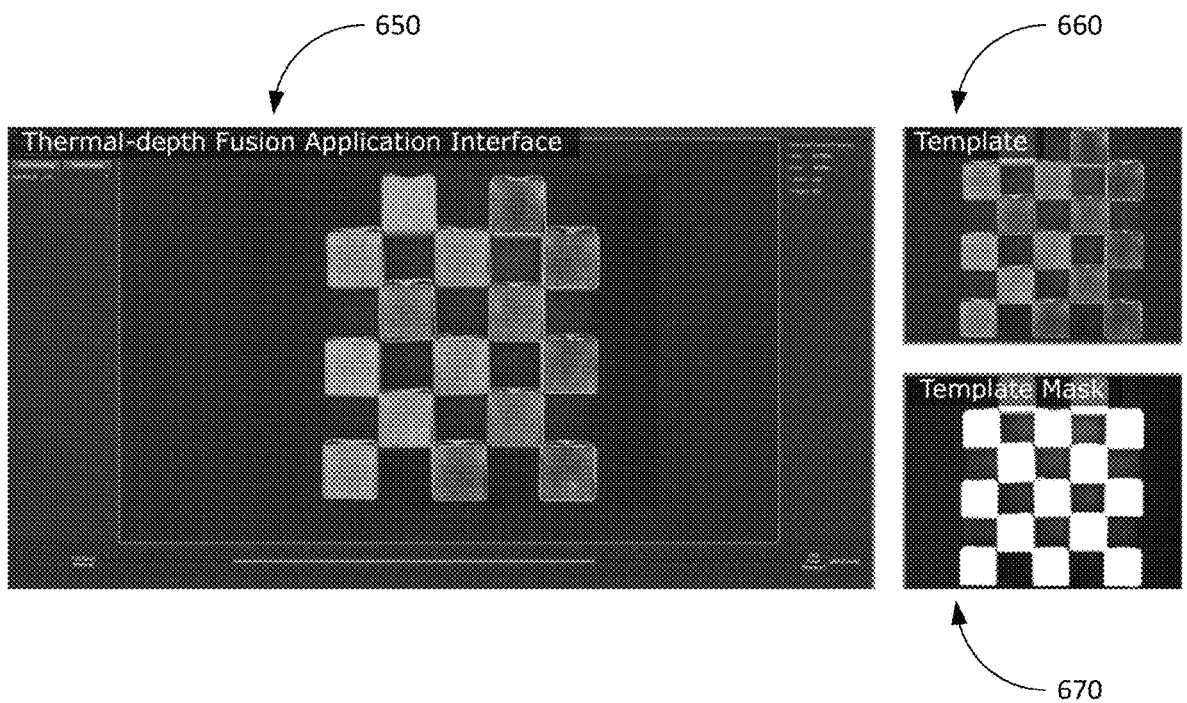

FIGS. 6A and 6B illustrate an example of a thermal-depth fusion experimental setup 600. In this example embodiment thermal-depth fusion experimental setup 600 includes thermal-depth template (target) 610, depth device 620, thermal device 630, and fusion application 640 running on a computer.

FIG. 6B further illustrates thermal-depth fusion application interface 650 with examples of the thermal-depth template 660, and a template mask 670.

Intrinsic-Based Transformation:

The process of generating a data aggregate from two imaging devices has been defined as a geometric transformation that relies on accurate information about the image generation intrinsic properties of the device. This includes the Field of View (FOV), the dimensions of the internal sensor array, and various properties of the devices lens that describe radial and tangential distortion.

The core of this technique utilizes a simple mathematical transformation to map image values from one device into the image coordinate system of another. Since this is based on the intrinsic properties of the two devices, it is context independent and works reliably for all cases once the calibration process has been completed. This is called a template-based calibration method and typically uses a black and white checkerboard or dot-based calibration pattern. Fusing imaging devices of different modalities introduces additional complexities due to the differences within each sensor array and how the signals are detected.

Unlike pairing two visible-spectrum cameras that rely on similar sensor arrays and optics, pairing other modalities introduces subtle differences in the image acquisition due to both the design of each device and minute variances in the signals that are integrated into two-dimensional image arrays. The primary deficiency with this form of image registration is that the operation depends on a single mathematical transformation function that maps an image from one device into the local coordinate system of the second camera. The primary problem with this formulation is that the image is a two-dimensional array of values, each subject to slight differences from the calibrated transformation and the true transformation. This is due to the construction and optics of the sensing device and its discrepancies with the aligned device, that varies with each pixel. Therefore, intrinsic-based transformations attempt to provide an alignment relation between all pixels in both images using a single transformation. Since this transformation is applied to all pixels, the variance of each sensor unit in the image plane is treated uniformly. These per-pixel errors generally result in disparity in multi-modal image fusion techniques due to errors in intrinsic estimation or distortion. To alleviate potential distortion effects introduced by using different optics on each device, prior methods introduce simplified models for radial and tangential distortion and compute their inverse to correct for lens shape and sensor alignment.

Scene-Specific Geometric Optimization:

Template-based image alignment techniques require a significant overhead within the initial calibration process due to many factors including: construction of the template, correct coefficient calculation from the template, and forming the final transformation. This process is significantly more complicated for introducing multiple imaging modalities because the template must be visible within each modality. In the instance of visible-light cameras, this can be as simple as printing a fixed pattern in different colors on a planar surface. However, for multiple modalities such as depth and thermal imaging, the template must be visible within the Infrared Radiation (IR) spectrum for both the thermal and depth measurements. This means that the template must provide a fixed pattern (such as a checkerboard) that varies both in depth and in thermal values. This means that structurally the template must be substantially more complex. To address this, methods using scene-specific optimizations were introduced.

An alignment process between two images is context-aware or scene-dependent if the algorithm requires the identification and correlation between similar shapes or objects within both images to perform the alignment. The context (object or shape within both images) defines the operational parameters upon which the alignment is formed, thus introducing a dependence on the current scene. Based on the assumptions about the types of objects that can be identified and discretized within both images, the alignment is performed by finding correspondences between the same features in both images. This provides a template-free method, that is, one that does not require a calibration process, however it requires objects visible within both imaging modalities and relies on the ability to effectively compute an accurate correspondence between object features in both images. The challenges associated with this approach are based on two factors: (1) the ability to differentiate key features within both modalities, and (2) correct correlations between these features must be correctly identified to ensure the alignment is maintained between both input streams.

Generative Fusion Through Machine Learning

Template-based image fusion methods provide accurate results, but require the construction of a template (fixed pattern visible to both modalities) and a complex calibration process. Context-aware fusion methods remove the need for a calibration process but impose specific assumptions about the images that will be collected with the devices. Furthermore, these methods assume that there are features within the scene visible to both modalities and that a correct correspondence can be generated within the images generated by each device.

Both of these general techniques provide approximate solutions to multiple-modality fusion, however they fail to provide adequate results for accurate data integration. This is due to three primary factors: (1) Computing a single transformation between image coordinate systems applies the same operation to all pixels uniformly resulting in a wide error distribution. This factor becomes prominent when there is a skew to the transformation, allowing the fusion to diverge towards the edges of the image or as the depth of the focus object increases (moves away from the mounted cameras). (2) For devices that have large margins between the characteristics of the intrinsic properties of the devices, image alignment and pixel mapping duplication becomes a significant problem. This results in a loss of data due to a single pixel value from one image modality being applied to multiple pixels within another and instances where image warping could be used to adjust small misalignments. (3) The result of the initial calibration or the on-the fly computation of the scene-specific optimization approaches do not improve the image fusion.

In the instance of the template-based method, initial errors established by the calibration are maintained through all images generated using these numerical coefficients. For the real-time optimization methods, false alignment estimates can be introduced at any time based on the failure to correctly generate the correlation between the two images. At this point, the method will fail due to the lack of a proper correspondence and will result in a temporary loss in the signal where there is no accurate fusion.

To introduce a multi-modal fusion alignment process that does not require extended use of templates, improves over time, and makes non-uniform adjustments specific to the exact hardware intrinsics of each device, the present invention utilizes generative data fusion through machine learning. The premise of this approach is to utilize data collected from the paired devices to provide an accurate alignment that is refined over time based on the number of images processed within the system.

The premise of this method is defined by the four following characteristics: (1) the pairwise mount of two devices both using one or more imaging modalities share a rigid structural configuration and view the same spatial domain, (2) the devices generate images that contain a features visible within each imaging modality during the initial model training, (3) the correlation of these features is established through pattern recognition using machine learning that extracts the per-pixel optimal transformation coefficients of the model to establish the fusion using a template or other fixed pattern heat source, and (4) the process continues to refine the fusion between the images until convergence. At this point, the model construction is complete and the devices can be utilized for generating fused images based on the trained model.

An example training setup that allows for the precise calibration of the thermal to depth image mapping is obtained using a thermally generated heat signature provided by an array of heat tiles. To integrate the depth component within this template, each region that does not have an electrically powered thermal tile is inset by approximately 4.0 cm. This array provides the basis for establishing the ground-truth (expected values) of the alignment for the correlation within our training process. This establishes the relation between depth features (edges, corners, etc.) and the thermal distribution correlating to these regions and the pixels that define them.

The present invention provides a method that introduces an automated calibration period during which the model is trained to identify the optimal fusion model for the current devices. Within this model, the machine learning algorithm correlates the per-pixel coefficients required to establish an accurate fine-grain (per-pixel) estimation of the transformations required to properly align every pixel to the coordinate system of the secondary device. This includes slight adjustments for imperfections in the devices or alignment and provides the ability to warp or slightly deform specific regions within the fusion to ensure a proper fusion is established. This is a feature that cannot be achieved through the use of a single geometric transformation.

Through the process of making slight deformations to these transformations, we can avoid alignment overlap (such as high thermal values being applied to the background). This accurate form of fusion is required for mapping minute thermal variances within the human face to an associated depth image. For this authentication process, the alignment of the thermal to depth measurements is critical to the generation of signatures that will generate the authentication basis.

Fusion Correlation Through Machine Learning:

The introduction of machine learning into the fusion process classifies the method as a template-based calibration process. However, the primary difference between traditional calibration methods and the present learning-based method is that the calibration evolves continuously as data is streamed from both devices. Therefore, the method is less susceptible to errors within a single static calibration (a 1-time process) using a standard template-based method. This is because the standard method for template-based alignment requires a fixed set of images. The larger the set of images, the more accurate the calibration result will be.

This method introduces two problems: (1) the number of images required to ensure an accurate fusion is arbitrary and time consuming to collect properly and (2) even if a sufficient number of images are used, they are still compiled into a single geometric transformation. Thus, even when a large number of images are collected, they are compiled into a small set of numbers that define this single transformation. Based on the variance of the ideal transformation required for an optimal alignment for each pixel within each image, the individual coefficients for each pixel are lost. To address this problem, the present invention utilizes per-pixel transformations that are established through an initial training process. This still defines a calibration period before long-term use, however the process allows the continuous stream of images to train the fusion model to obtain the highest accuracy possible.

Figure 7A:
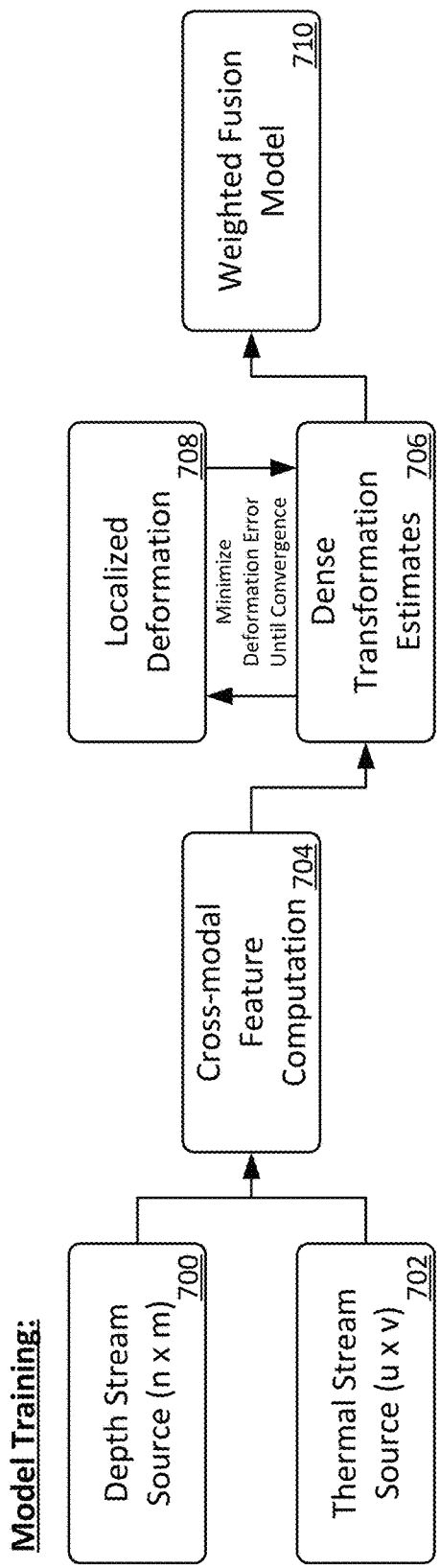
FIG. 7A illustrates a block diagram of an example method for model training.
Figure 7B:
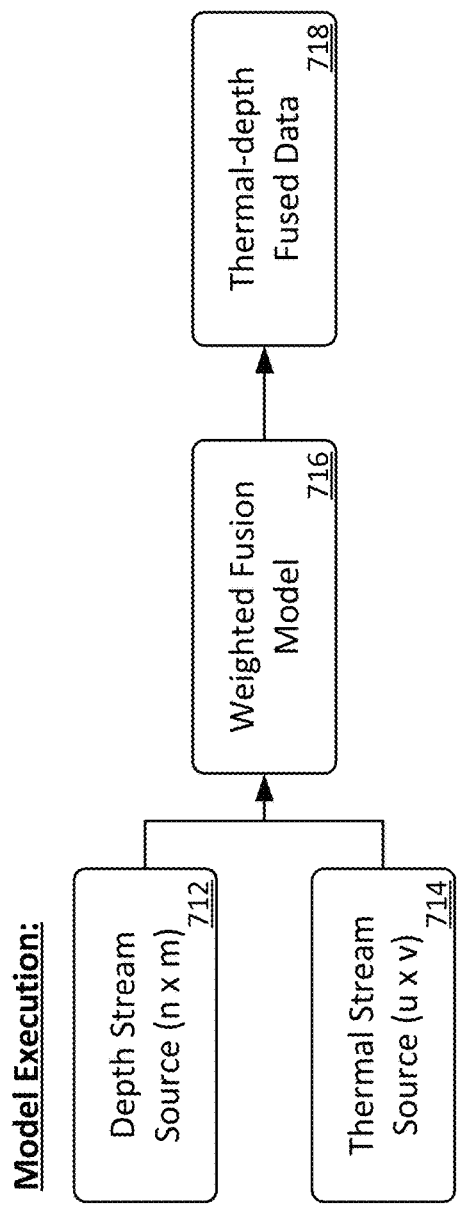
FIG. 7B illustrates a block diagram of an example method for model execution.

FIG. 7A illustrates a block diagram of an example method for model training, and FIG. 7B illustrates a block diagram of an example method for model execution. In this example embodiment of the present invention, a method of model training includes receiving a depth stream source 700 with dimensions of (n×m), and a thermal stream source 702 with dimensions of (u×v).

Module 704 performs cross-modal feature computation on depth stream source 700 and thermal stream source 702 and passes the results to module 706. Module 706 performs dense transformation estimates and module 708 iteratively performs localized deformation minimizing the deformation error until convergence. Upon convergence, module 710 produces a weighted fusion model.

The example method of model training is further detailed in the algorithm below.

---

Model Training: Thermal Sequence (u x v):TI, Depth Sequence (n x m):DI, Template:template
  For each training instance i on input sequences TI, DI across image indices i,j:
    F := crossmodalFeatureComputation(TI, DI, template) // Dense features (all pixels)
    $f.T_{ij}$ := DenseTransformationEstimate($f.t_{ij}$, $f.d_{ij}$) // Pixel transformation estimation $\forall f \in F$
      $D_{ij}$ := TransformDeformation($T_{ij}$) // Estimated deformation used to minimize local error
      $\hat{D}_{ij}$ := Grad($D_{ij}$, $template_{ij}$) // Direction of the gradient towards template expected value
      $\epsilon$ := SubpixelDistance($D_{ij}$, $template_{ij}$) // Evaluation of the error w/r to the expected value
      $D_{ij}$ += $\hat{D}_{ij}$
    // Train on the correlation between the transformations of the current image streams and the
    // expected transformations as evaluated through the template (ground-truth). The trained model
    // contains the weights associated with the transformation of each pixel for a correct alignment.

---

TrainModel(epochs, model, F): // Where F contains the set of all dense pixel transformations
  inputValue := $f.T_{ij}$ , $\forall f \in F$
  expectedValue := $template_{ij}$
return model.

---

In this example embodiment of the present invention, a method of model execution includes receiving a depth stream source 712 with dimensions of (n×m), and a thermal stream source 714 with dimensions of (u×v).

Module 716 produces a weighted fusion model, and module 718 produces thermal-depth fused data.

The example method of model execution is further detailed in the algorithm below.

---

Model Execution: Thermal Sequence (u x v):TI, Depth Sequence (n x m):DI, Model:model
  ExecuteModel(TI, DI, model, F)
    // Using the transformations stored in F, compute the fusion between the provided image streams.
    // The resulting transformed image $\tilde{TI}$ will contain the thermal image values within the image
    // coordinate system of the depth image DI
    $\tilde{TI}$ = Transform(TI, F)
    // The resulting fusion contains both discrete thermal and depth measurements within a consolidated
    // data aggregate that can be used to extract relational behaviors between the shared modality
    return aggregation($\tilde{TI}$, DI)).

---

Within the formulation of this trained model, the training data and expected values must be defined for all pixels within the image. The input of the training data is derived from the source images provided by the depth and thermal streams from the imaging devices. Since expected values are not provided between these images, a cross-model correlation must be established between the thermal and depth images. In this correlation the present invention assumes sufficient separation between the focus object and the background, both in depth and thermal values. The prominent relationship between thermal and depth images can be identified through the use of objects that have high thermal values and discrete edges.

Stereoscopic Thermal Signature Reconstruction Through Generative Fusion:

Different imaging modalities provide the ability to form data aggregates that can be consolidated within the image domain and extrapolated to higher dimensional representations. For traditional images using the visible spectrum, the introduction of two images in a stereoscopic configuration will introduce the ability to discern three-dimensional spatial relationships. When the device modalities are the same, the challenges introduced through finding corresponding features in each spectral band are minimized due to the similarity of the measurements that are obtained by both devices. This provides a basis upon which edges, objects, and features can be extracted to reliably reconstruct accurate models of 3D environments using the visible spectrum. To extract higher-level thermal characteristics that incorporate both heat distributions and 3D reconstructions of thermal environments, the present invention introduces a stereoscopic form of thermal fusion. The core of this technique is defined by: two thermal cameras, their alignment through generative fusion, and the extraction of spatial relationships of thermal signatures. This provides a basis for extracting 3D thermal behaviors through the stereoscopic configuration of thermal cameras.

Thermal-Depth Fusion for Biometric Facial Authentication:

Traditional facial recognition algorithms based on color images provide a unique signature of an individual based on the spatial composition of color distributions within the image. This works well for the classification of individuals, but only works in ideal lighting and does not provide a stable basis for authentication due to the potential similarities between individuals. Additionally, these methods are incapable of distinguishing between an individual's face and a printed picture of their face.

To address these problems and improve signature uniqueness using facial images, alternative methods utilize depth images generated from IR imaging. This provides a sparse depth image of the individual's face that forms a 3D representation that describes the shape and contours of the face that can then be used for authentication. This has the benefit of working in all lighting conditions, however due to the limited expressiveness of the depth image, multiple individuals can still be incorrectly authenticated. This is due to the error within the depth image and the capture angle resulting in looser constraints to limit the impact on usability. Additionally, an individual's facial geometry can change throughout the day for many reasons including: time of the day, before and after eating, exercise, body and neck posture, and emotional state.

Achieving a strong form of authentication solely based on the 3D structure of the face could be possible by tightening the error threshold, but would also increase the frequency of false positives. Therefore, based on the relaxed expressiveness of the depth image, multiple people can match the authentication threshold. In the exploration of alternative imaging methods for authentication, thermal imaging has also been introduced as a more expressive baseline, however due to the high fluctuations in normal facial temperatures, recent techniques simplify thermal images down a minimum set of information. Typically, this results in the thermal image being decomposed into a single binary pattern that outlines hot regions within the face.

The primary problem with these approaches is that they are not unique between individuals. This is due to two factors: (1) the algorithmic process of reducing thermal images to binary patterns removes most of expressiveness of the image and (2) the high fluctuations in facial temperatures make extracting consistent signatures difficult. The presented generative algorithm does not impose any assumptions about the characteristics of the image sources and therefore is applicable to wide variety of image fusion between multi-modal devices. This is important for the development of a reliable fusion mechanism for thermal and depth sensors that are very different in resolution, sensor dimension, optical design, frame-rate, and other various characteristics such as distortion parameters. The high variance expressed between thermal and depth imaging devices is also common between various other devices that could be combined within a multi-modal fusion. Therefore, with the introduction of the present generative alignment process, various multi-modal sensor configurations can be calibrated with this approach.

Biometric Thermal Signatures:

The thermal distribution defined across a physical surface generated by a heat source is both a function of the structural and material composition of the surface and the heat source. Therefore, this distribution can be identified as a unique thermal signature if the distribution and geometric structure is sufficiently complex. By extension of this observation, the uniqueness of this signature is derived from the structure that defines the distribution, the integration of the heat source, and the distribution of the heat throughout the surrounding biomass.

Figure 8:
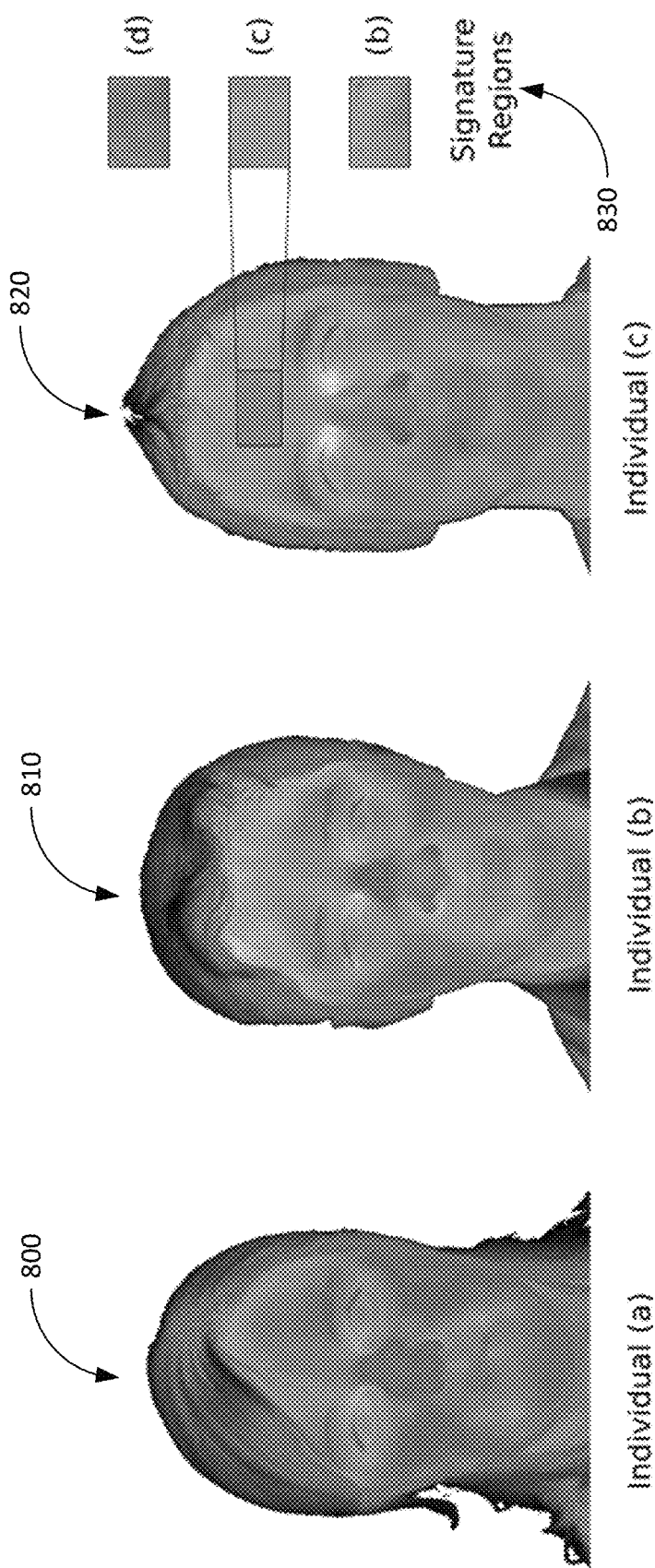
FIG. 8 illustrates thermal profiles demonstrating the unique thermal signature of multiple individuals.

The images in FIG. 8 illustrate the thermal signature differences between three individuals, demonstrating the prominent differences within each of the unique thermal distributions. The objective is to integrate these complex signatures with the structure provided within the depth image. Therefore, for more complex geometric structures with varied heat sources such as a human face, the entropy of the signature increases with the introduction of the depth component, improving the uniqueness of the distribution.

To apply this principle to thermal-depth fusion, the present invention leverages both the thermal distribution over the surface of an object and its geometric structure to form a unified distribution signature composed of both the curvature of the face and the thermal distribution. This includes the surface temperature, surface normals, principle curvature, and relational key-points that can be used to form complex signatures that are difficult to mimic and obscure, making it viable for numerous forms of strong authentication.

FIG. 8 illustrates thermal profiles demonstrating the unique thermal signature of multiple individuals. The thermal signature varies drastically throughout the face due to differences in facial structure and blood flow. In this example illustration, individual (a) 800, individual (b) 810, and individual (c) 820 are shown with their thermal profiles. An exemplary signature region 830 of the forehead is also illustrated.

To illustrate the concept of thermal signatures, note the uniqueness factor of the human face due to its natural heat distribution and complex geometric structure. The images in FIG. 8 illustrate three highly unique thermal signatures obtained from a high-resolution thermal camera. The distribution pattern of each image is highly individualized for a number of reasons including: blood flow to the cheeks is dependent upon the individual's vascular structure, heat distributions uniquely permeate the dermis and epidermis layers of the skin, and capillary distributions form unique gradients across the surface of the skin. These images illustrate the uniqueness of an individual's thermal signature with respect to those of another individual.

Providing these signatures as a baseline within thermal imaging provides a reliable foundation for contributing to thermal-depth fusion-based authentication. However, the absolute value of the thermal reading can wildly fluctuate over time. This can be the result of numerous influences including: physiological changes, emotional states, movement, and countless other factors. Due to this, the absolute temperature measurements cannot be used to establish authentication metrics.

The premise of this method is to extract the consistent thermal distribution patterns unique to each individual. The variance of the distribution will naturally change with the state of the individual, however, the biometric thermal distribution will remain consistent during these changes. This allows the present invention to identify markings held within the outer layers of the skin to establish an authentication signature, that is even distinguishable between an individual's left and right cheeks, as shown in FIG. 9.

Figure 9:
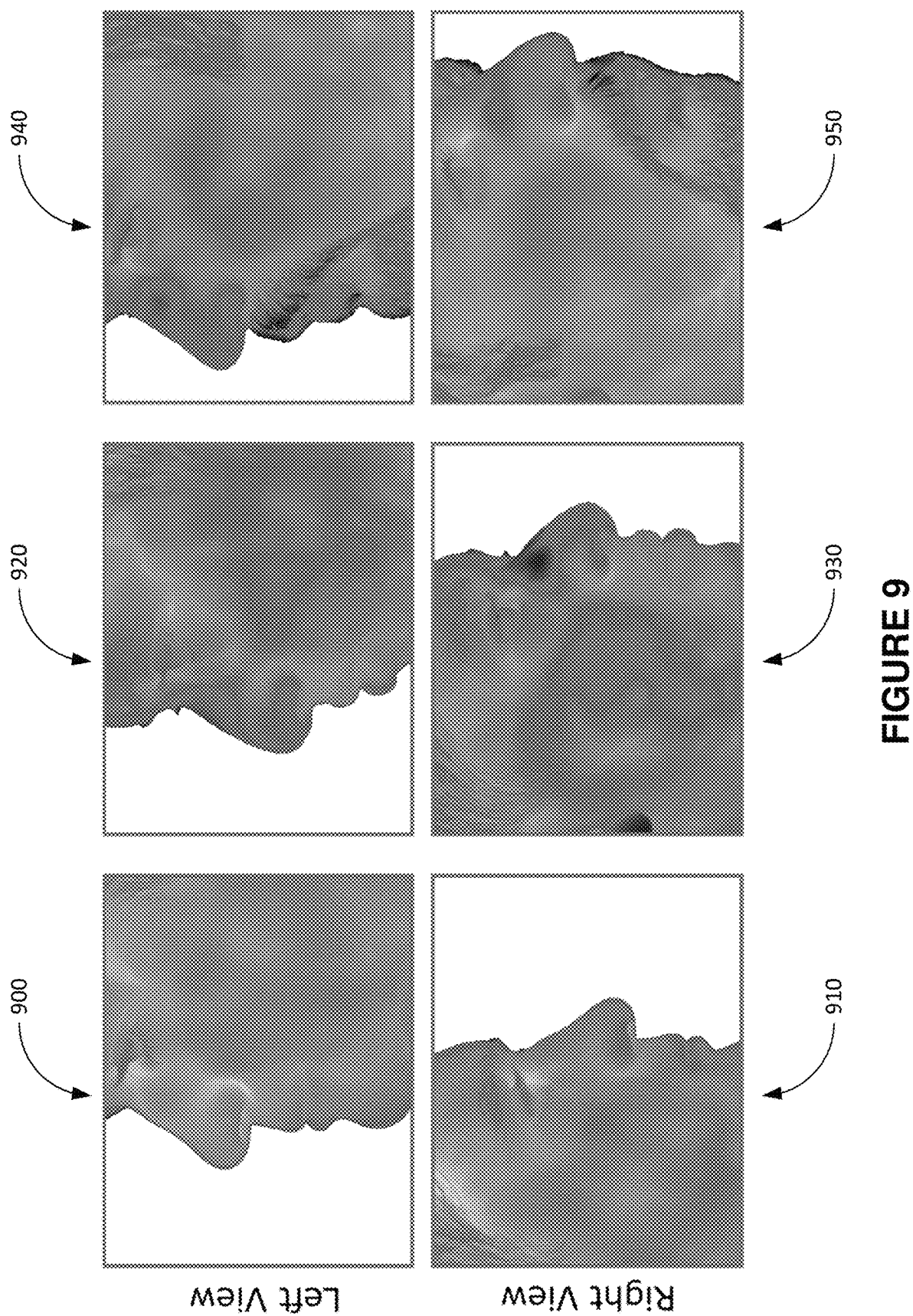
FIG. 9 is an illustration of how the thermal signature varies between the left and right cheeks of the same individual.

FIG. 9 is an illustration of how the thermal signature varies between the left and right cheeks of the same individual. This provides a basis for establishing authentication based on partial observations.

In this example, individual A is shown in a left view 900, and a right view 910, individual B is shown in a left view 920, and a right view 930, and individual C is shown in a left view 940 and a right view 950.

To obtain a biometric thermal distribution based on the thermal distribution obtained from the thermal component of the fused data, the present invention provides a four state method for generating a hierarchical feature map by: (1) decomposing the image into a hierarchical tree, where at each node the present invention identifies the equation of the line perpendicular to the gradient and recursively merges each node at these positions to generate 3D iso-lines that expresses a high-level representation of the thermal patterns in the face. (2) forms a set of line segments within the lowest level of the gradient feature map. (3) Merges nodes of lower levels to generate geometric primitives that span various regions of the face, describing unique thermal distributions. (4) The highest level within this hierarchy composes the facial features of the entire face.

This method provides for the determination of which set of potential features must be compared starting at the root of this hierarchy. This provides the basis for establishing partial signature identification based on a bottom up hierarchy construction defined within the model training algorithm below. This algorithm interprets the thermal distribution of the face as a 2D function defined by the thermal intensity of the pixels, extracts prominent features (ridges, valleys, and then constructs the hierarchy that most accurately describes the biometric thermal distribution.

distribution based on feature shape, distance, and movement. From specific regions one can now tie geometric shape, surface normals, and principle curvature to the associated thermal distribution, and monitor these changes over time. This makes regions such as the nose, cheek structure, and minute movement details contribute additional harmonic information to the individualized signature. This provides a strong basis for establishing combinatorial number of feature states that can be used to uniquely identify an individual. The images within FIGS. 10A and 10B illustrate an example of the thermal-depth fusion result and its application to a human face.

Figure 10A:
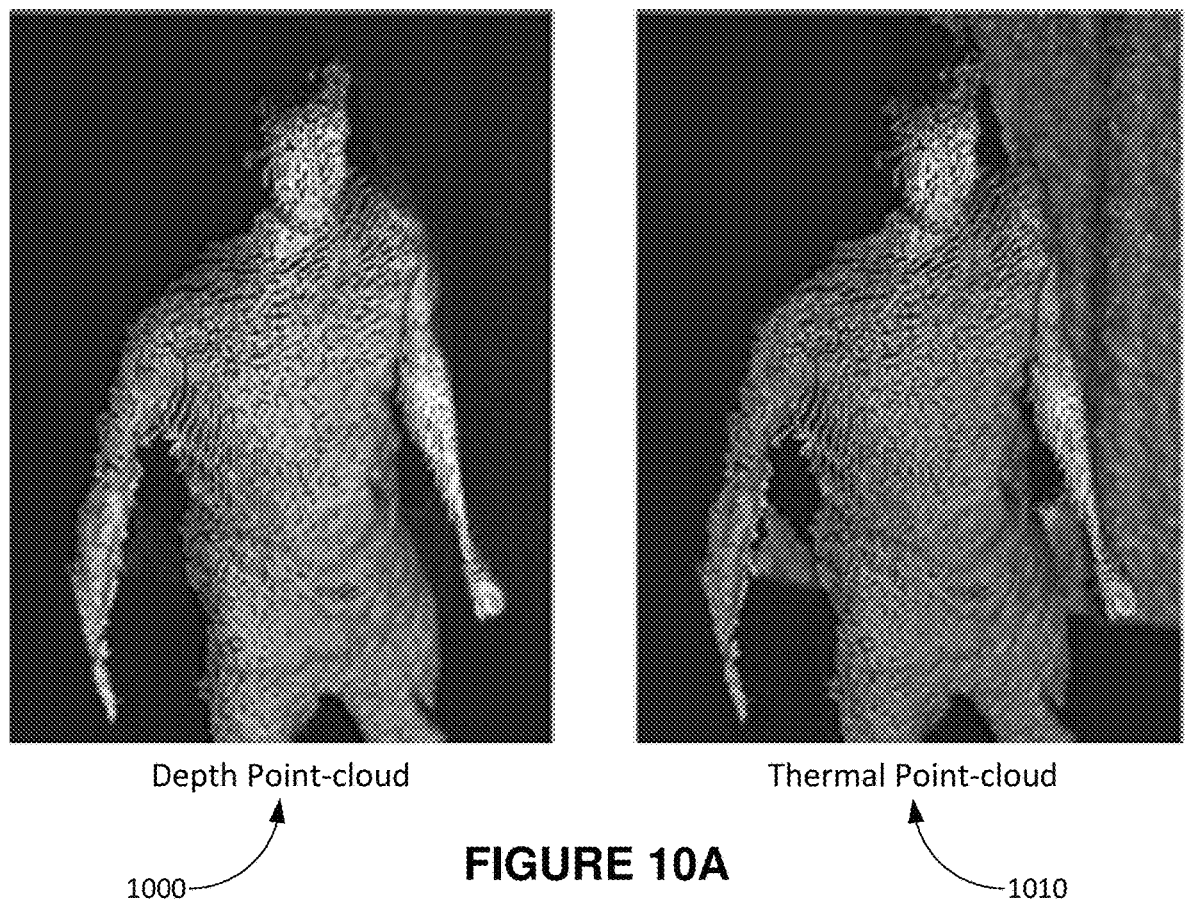
FIGS. 10A and 10B illustrate an example of the thermal-depth fusion result and its application to a human face.
Figure 10B:
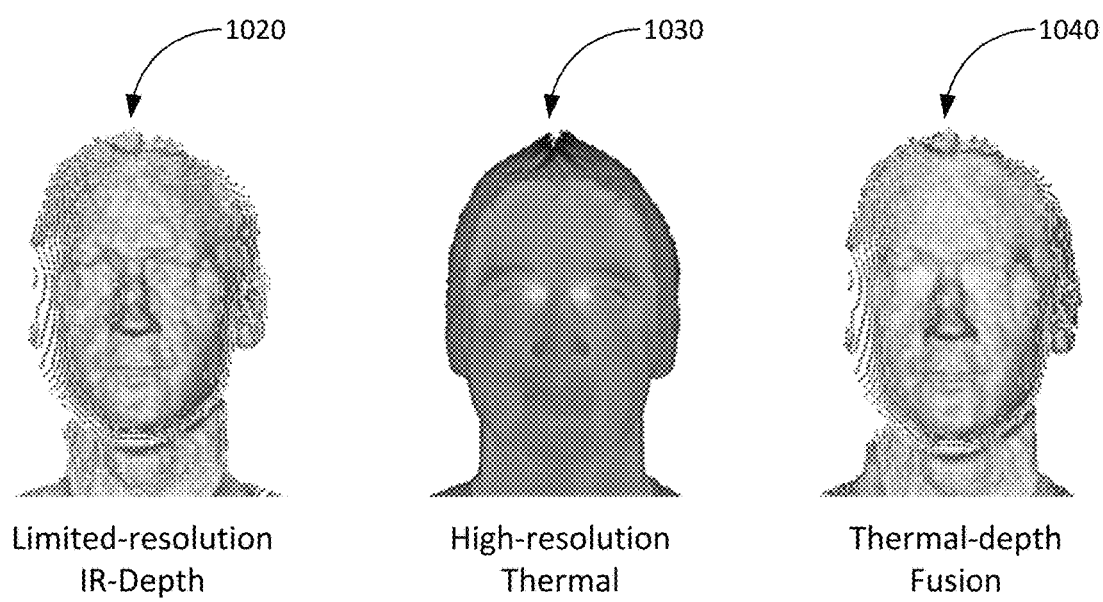

FIG. 10A illustrates depth 1000 and thermal 1010 point-clouds. FIG. 10B illustrates a face depth image 1020, high-resolution thermal image 1030, and the result of the thermal-depth fusion 1040 that provides a three-dimensional surface heat map identifying the thermal distribution of the current signatures present within the individual's face.

Unique thermal signatures have received attention for various practical applications including human-computer interaction, authentication, and security, however one of the primary differences is the analysis of the thermal distribution within a surface, rather than the residual shape of the surface outline. Prior techniques in thermal-based hand security analyze the thermal outline and shape of the heat source, but do not address the uniqueness of thermal gradients and signatures for use in facial authentication. Other techniques

```
Model Training: Thermal Sequence (u x v):TI, Resolution:r
    h := null // Initially the hierarchy is empty (will be constructed bottom up)
    F := FaceSegmentation(TI) // Extract the face from the surround environment, F contains
face pixels
    V := ValleyDetection(F) // Identify thermal valleys within the face (correspond to biomat
heat sinks)
    R := RidgeDetection(F) // Identify thermal ridges within the face (loosely correlate to
vascular struct)
    // Based on the provided spatial resolution r, primitive segments connect iso-temperature
gradients
    // derived from the valleys and ridges of the thermal distribution. F, V, R form a gradient
feature map
    S := segments(F, V, R, r)
    // While the hierarchy does not converge to a root primitive incorporating the entire face,
repeat
        While currentLevelPrimitiveCount > 1
            layer := FormPrimitives(F, V, R, r) // Generate the primitives of the current level
            mergedLayer := MergePrimitives(layer) // Geometric form of the thermal distribution
as a layer
            AppendLayer(h, mergedLayer)
            // The current layer contains a reduced number of primitives that describe the face
domain
            currentLevelPrimitiveCount = |mergedLayer|
    return h.
```

While the thermal distribution of the face provides a good foundation for identifying unique signature of the individual, the present invention pushes this concept further into the domain of thermal-depth fusion by combining this thermal signature with the depth information of the individuals face. While the prior method of generating a hierarchical feature map provides a strong thermal authentication basis, the natural variance of thermal values and the limitation of current hardware in resolution and the limited number of variances per pixel is not sufficient to achieve a strong level of authentication. Therefore, thermal-depth fusion has a significant impact on the uniqueness factor of the signature due to the additional geometric definition of the face by adding the depth component.

This allows the present invention to introduce harmonic signatures (relations between depth and thermal patterns) that relate the physical structure of the face to the thermal related to thermal facial recognition also demonstrate that the technique can be used without light or in vastly different lighting conditions, which allows for the extraction of these signatures under a wide variety of environmental conditions, but does not make unique markers within the thermal distribution itself.

Hierarchical Harmonic TD Signatures.

One of the prominent advantages of thermal-depth imaging is the ability to authenticate on partial signatures or through visual occlusions. Numerous feasible conditions can result in the partial coverage of an individual's face including facial hair, glasses, or makeup. In addition to these conditions, simple view-oriented occlusions can also be introduced by viewing the individual's face from an angle. To address these problems, the present invention introduces a hierarchical form of harmonic thermal-depth signatures that define different resolutions of prominent features to improve the likelihood of a correct classification.

To generate this hierarchy, the present invention utilizes a decomposition of primary features within the face that define thermal patterns that remain consistent over different environmental and physiological shifts in temperature. This facilitates the identification of small regions that maintain similar but varying gradients over the surface of the skin. To model this variance, the present invention includes a class of functions that describe the overall behavior of the surface region. The behavior of the functions within a given class represent the signature of the thermal distribution throughout differences in temperature. Due to the numerous sources of variance within the thermal signature, the present invention does not identify the source but rather simply model the physiologically possible states.

Figure 11A:
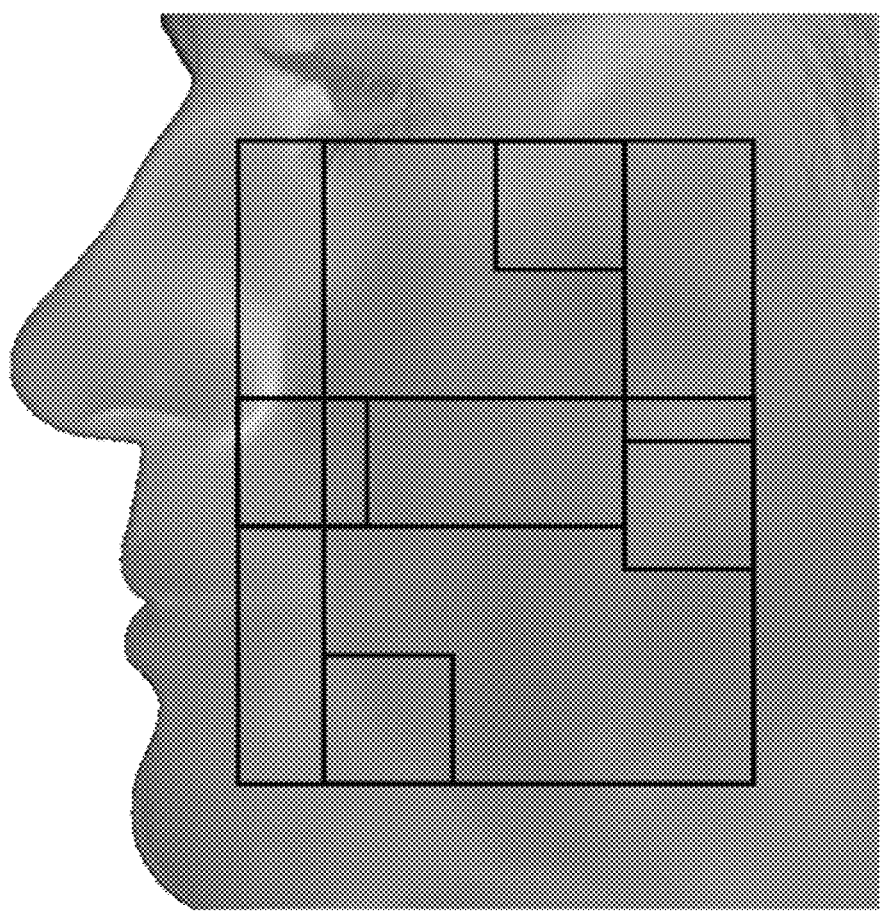
FIGS. 11A and 11B illustrate a hierarchy of thermal signatures corresponding to invariant features defined by the biometric distribution of the individual's vascular system, skin composition, and capillary patterns.
Figure 11B:
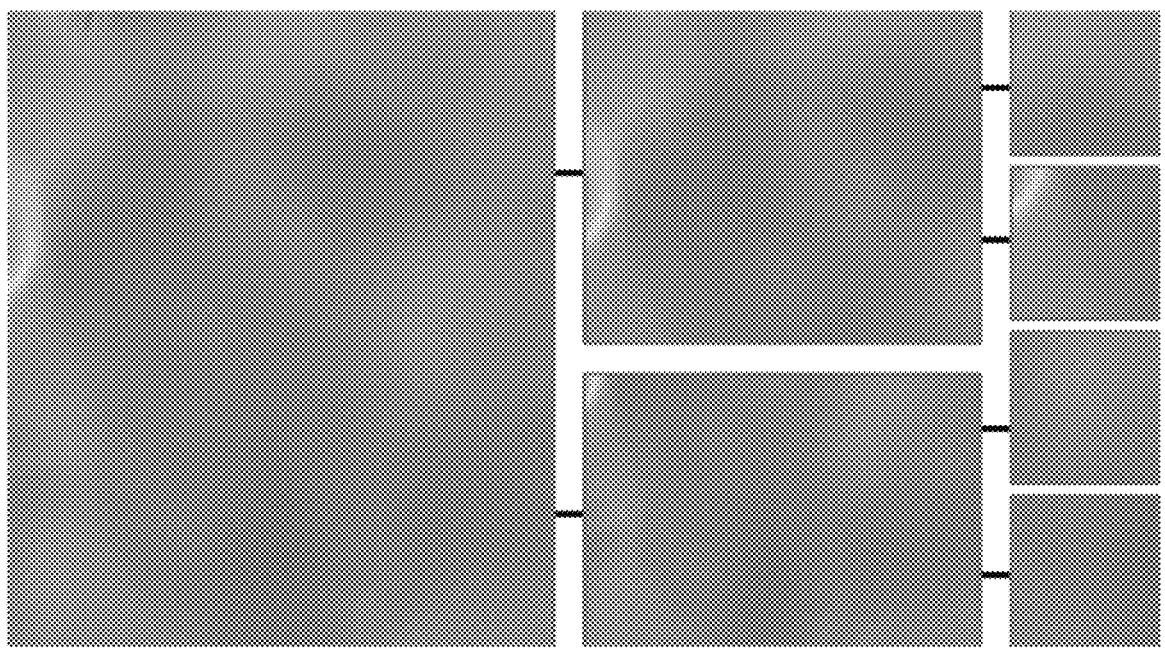

FIGS. 11A and 11B illustrate a hierarchy of thermal signatures corresponding to invariant features defined by the biometric distribution of the individual's vascular system, skin composition, and capillary patterns. In this example embodiment, FIG. 11A illustrates a plurality of thermal signatures defined within the thermal image of a human face, and FIG. 11B illustrates a hierarchical organization of various thermal signature area of the human face.

The introduction of this hierarchy, integrated with the presented thermal-depth fusion method provides a viable means for obtaining partial matches between an individual and the trained classification model. Based on a set of a few clearly visible features, the present invention can still ensure a partial match that can provide a reasonably strong authentication. From the level of the authentication required for the application domain, this presents a viable alternative to rejecting partially occluded identifications.

Race Independent Thermal-Depth Facial Authentication:

Machine learning techniques commonly introduce bias due to the characteristics of the datasets used to establish the correlation required for authentication. Based on the form of the input data, specific biases are harder to eliminate and can potentially skew the dataset towards unintended behavior. This may lead to lower probabilities of correct classifications used for authentication or may generate unforeseen biases that are difficult to identify.

In the instance of facial recognition, racial and facial structure biases are factors that difficult to control using normal color (RGB) images. Providing carefully balanced and bias-free datasets becomes a large challenge for establishing effective systems for facial authentication, and even if an ideal data set can be obtained there will still be underrepresented traits. To eliminate the potential for these biases, the present invention uses thermal and depth (IR) image fusion to generate 3D images of individual faces to provide non-biased authentication methods. In the image sequence illustrated by FIG. 12, the racial impact within the depth and thermal fusion is nonexistent within the fused data form.

Figure 12:
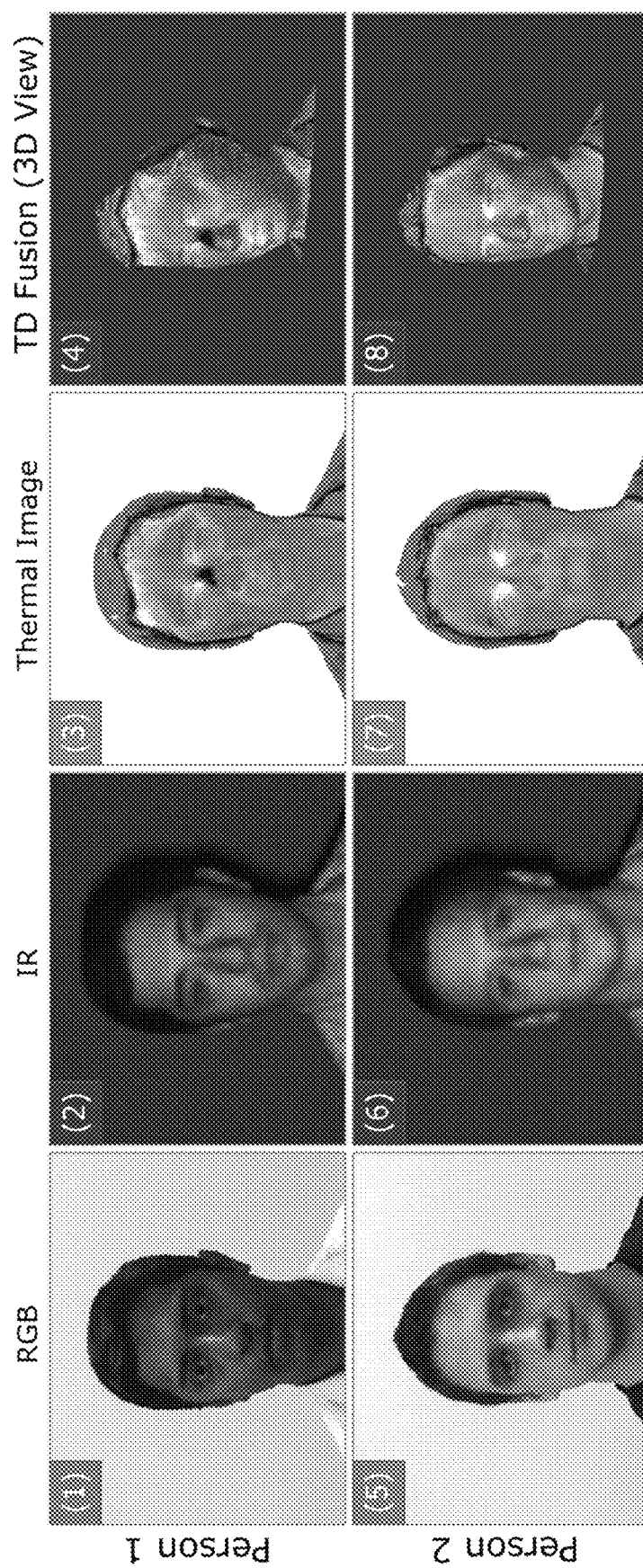
FIG. 12 is an illustration of how thermal-depth fusion provides race independence within authentication.

FIG. 12 is an illustration of how thermal-depth fusion provides race independence within authentication. The resulting facial structure and skin tones modify the unique signatures of each individual. Individual 1 is illustrated in images (1-4) and individual 2 is illustrated in images (5-8). Each individual is illustrated in RGB, IR, thermal, and thermal-depth fusion images.

The ability to represent a unique identity independent of skin tone using thermal distributions eliminates the potential for racial bias within the authentication process. Additionally, the collection of data does not require added constraints due to the potential to skew the dataset towards any specific group. This simplifies both the data collection process and ensures consistency between individuals.

The foundation of this approach to depth-thermal fusion is dependent upon the creation of a multi-camera device that can facilitate real-time streams of both depth and thermal images. Due to the recent advancements in the miniaturization of commercially available sensors, these devices can be consolidated into small wearable solutions that provide an unobtrusive method of recording depth and thermal images for a variety of applications. Based on the design, development, and deployment of an exemplary device, the design phase has been segmented into four components that demonstrate the foundation of the core technology.

These components include: (1) a working lab-quality device for thermal-depth imaging, (2) the robust fusion and data integration between the depth and thermal cameras, (3) the miniaturization of the devices to a mobile solution, and (4) the wireless communication used to transfer fusion data to remote servers for analytical analysis. This device is composed of three main sensors: a thermal camera (IR-band), depth transmitter (D-Tx), and depth receiver (D-Rx), all of which will be enclosed in a 3D printed case reinforced for durability. The primary design of these exemplary devices is based on the following set of considerations, usability, and implementation objectives.

Mobile/Stationary TD Imaging—

An initial prototype provides a reliable foundation upon which the depth-thermal fusion process may be improved through machine learning and synthesizing thermal and depth relationships into unique authentication signatures.

Miniaturization and Mobile Solution—

The integrated depth and thermal cameras are combined with a computing device (processing system) that can execute the trained fusion model. This requires an unobtrusive design that does not interfere with normal work practices, and enough power to provide the onboard processing for fusion, recording, and wireless operations.

Robust Data Collection and Integration—

Thermal-depth fusion is performed on the device, and the resulting images can then be transferred to a remote server for feature extraction.

Wireless Communication—

Due to the limited internal storage on mobile devices and the redundancy required for data collection, it is desirable to provide wireless communication methods for transferring data for both further analysis and backup procedures.

Device Spatial and Temporal Synchronization:

Device spatial (resolution) and temporal (frame rate) synchronization is an important aspect of fusing multiple modalities from different imaging devices. Some researchers proposed to synchronize multiple modalities using phase synchronization and time shifting. As a practical and inexpensive fusion solution, the present invention addresses frame rate differences between the depth and thermal devices through temporal interpolation, and addresses resolution discrepancies through spatial interpolation. This will allow for the provision of consistent synchronization between the image streams generated by both devices. The image sequence in FIGS. 13A and 13B illustrate the depth and thermal image sequences over time, synchronized to nearest timestamp values recorded within the image sequences received from each imaging device.

Figure 13A:
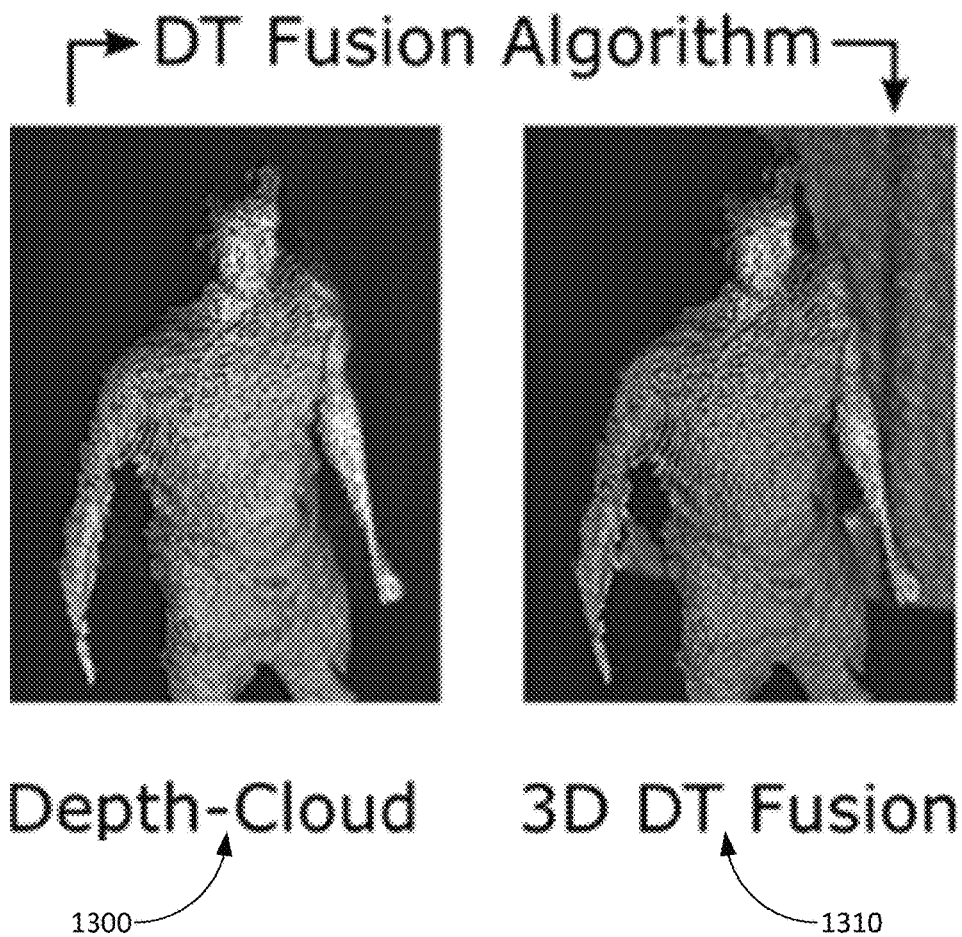
FIG. 13A illustrates the result of the TD Fusion Algorithm for generating a thermal-cloud for visualizing a human figure in 3D space.
Figure 13B:
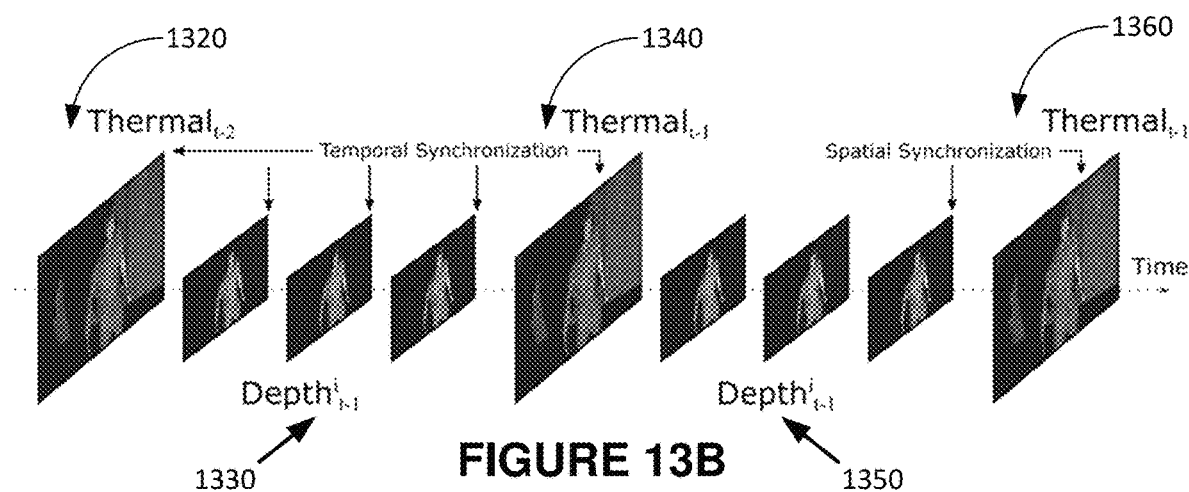
FIG. 13B illustrates the synchronization of depth and thermal images through spatial and temporal interpolation using closest timestamps.

FIG. 13A illustrates the result of the TD Fusion Algorithm for generating a thermal-cloud for visualizing a human figure in 3D space. FIG. 13B illustrates the synchronization of depth and thermal images through spatial and temporal interpolation using closest timestamps.

In this example embodiment, FIG. 13A illustrates a depth-cloud image 1300, which is processed into a 3D thermal-depth image 1310 via the thermal-depth fusion algorithm. FIG. 13B illustrates one example method for synchronizing depth and thermal images. In this example, thermal images 1320, 1340, and 1360 are integrated with depth images 1330 and 1350 based on their temporal synchronization.

Lab-Quality Device: To provide lab-quality thermal-depth fusion, two existing high-performance thermal and depth imaging devices are used within a calibrated experimental setup. For an example implementation, two high-resolution imaging devices are combined: one for thermal image acquisition and another for depth image acquisition. In development, a FLIR A-Series camera is used to provide thermal images, and a MICROSOFT KINECT-2 is used to provide depth images and point-cloud reconstruction.

The FLIR A-Series thermal camera provides high-resolution thermal images (640×512) at 30 fps, and the KINECT-2 generates depth images (512×424) at 30 fps. To pair the devices, they are mounted on a shared tripod mount with a custom aluminum bracket providing a rigid relational alignment. The field of view for each device overlaps the same spatial region based on this alignment, therefore the devices are held within a rigid fixed position and orientation with respect to each other.

Figure 14:
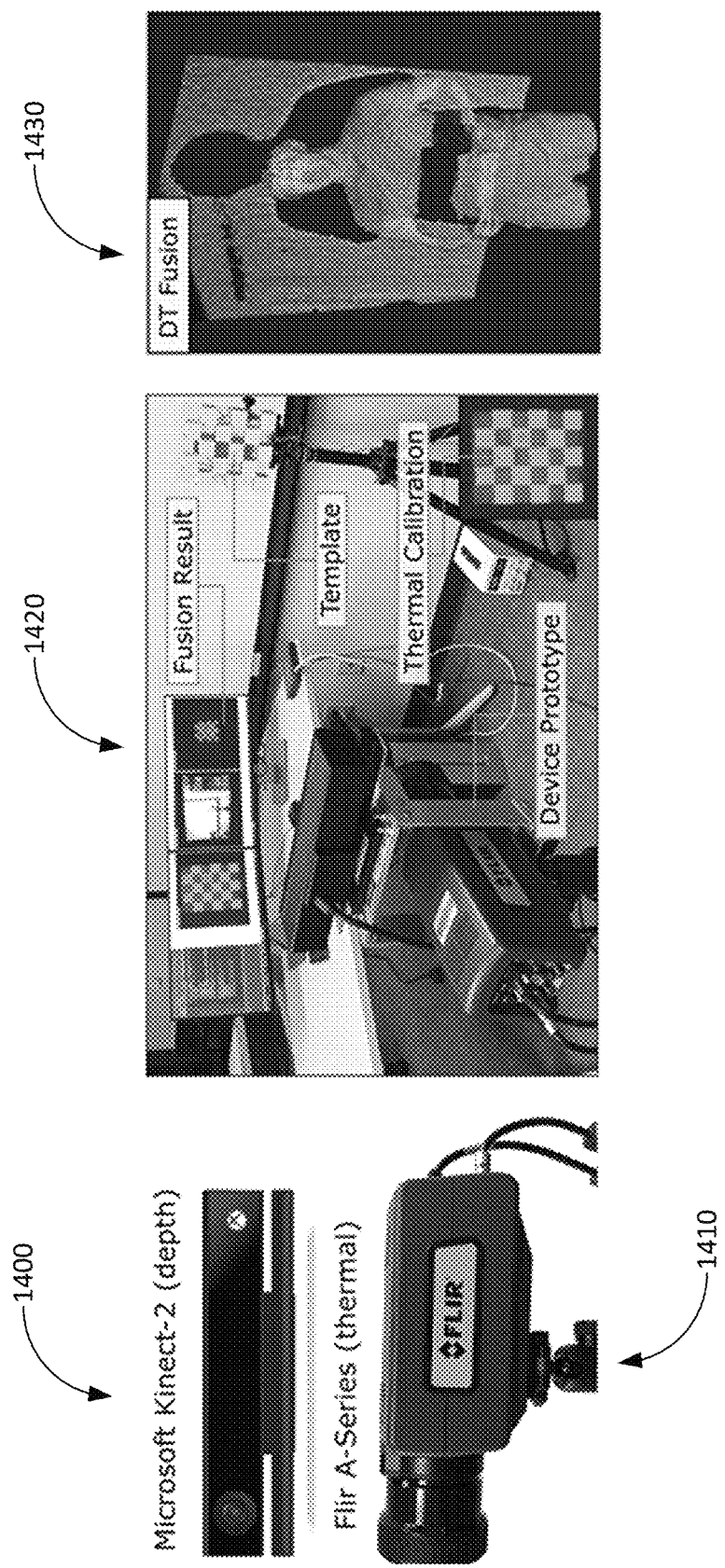
FIG. 14 illustrates an exemplary depth-thermal fusion hardware solution.

FIG. 14 illustrates an exemplary depth-thermal fusion hardware solution combining both the MICROSOFT KINECT-2 1400 and FLIR A-Series camera 1410. For the fusion algorithm, a machine learning-based approach is employed within imaging system 1420 for a highly accurate alignment for thermal-depth images. The result 1430 of this fusion is illustrated on the left.

The refined alignment presented is obtained utilizing an initial training procedure that correlates the features identified within both modalities leading to a convergence of the trained model. This convergence indicates that the model has established a unique mapping between sub-pixel spaces within the thermal and depth images to obtain an optimized alignment. For validation of this calibration process, a thermal-depth template has been developed that allows the standard checkerboard calibration pattern to be visible to each camera for the use with template-based techniques to ensure the validity of the fusion.

This template design includes elevated blocks for low and high regions in the depth image, and power-heated tiles to illuminate the pattern in the thermal image. The fused thermal-depth template is shown in FIG. 14, along with the result 1430 of the fusion used to visualize physical trace evidence and a human figure in real-time using the present solution. The resulting fused images are then stored within an aggregated dataset that contributes to a set of higher-level feature extractions such as surface normals, principle curvature, and thermal behavioral patterns based on a variety of environmental conditions.

Mobile and Embedded Device Development:

Hardware implementations of the primary depth and thermal sensors required for designing new embedded systems that support multi-modal sensing are well studied and are widely available in scales suitable for mobile devices. These components provide an adequate means of creating new mobile prototypes that facilitate multi-modal imaging between depth and thermal imaging. Due to the maturity of these sensing devices, the power consumption and scale of the individual sensors required for fusing depth and thermal imaging, have been minimized to the point where mobile solutions can be rapidly designed and prototyped.

As part of the process for fusing these two modalities and the numerous applications that can utilize isolated thermal and depth sensing in a mobile platform, we propose the consolidation of three commercial level products (or equivalent) devices that can be used to record and display thermal depth images. The microcontroller 1500 (RASPBERRY PI) used for processing and visualization is shown in FIG. 15 with the depth imaging board 1510 (TEXAS INSTRUMENTS OPT8241 3D Time-of-Flight sensor), the thermal sensor 1520 (FLIR LEPTON), and an LCD screen 1530 such as the SONY CLM-V55 Clip-On LCD.

Figure 16:
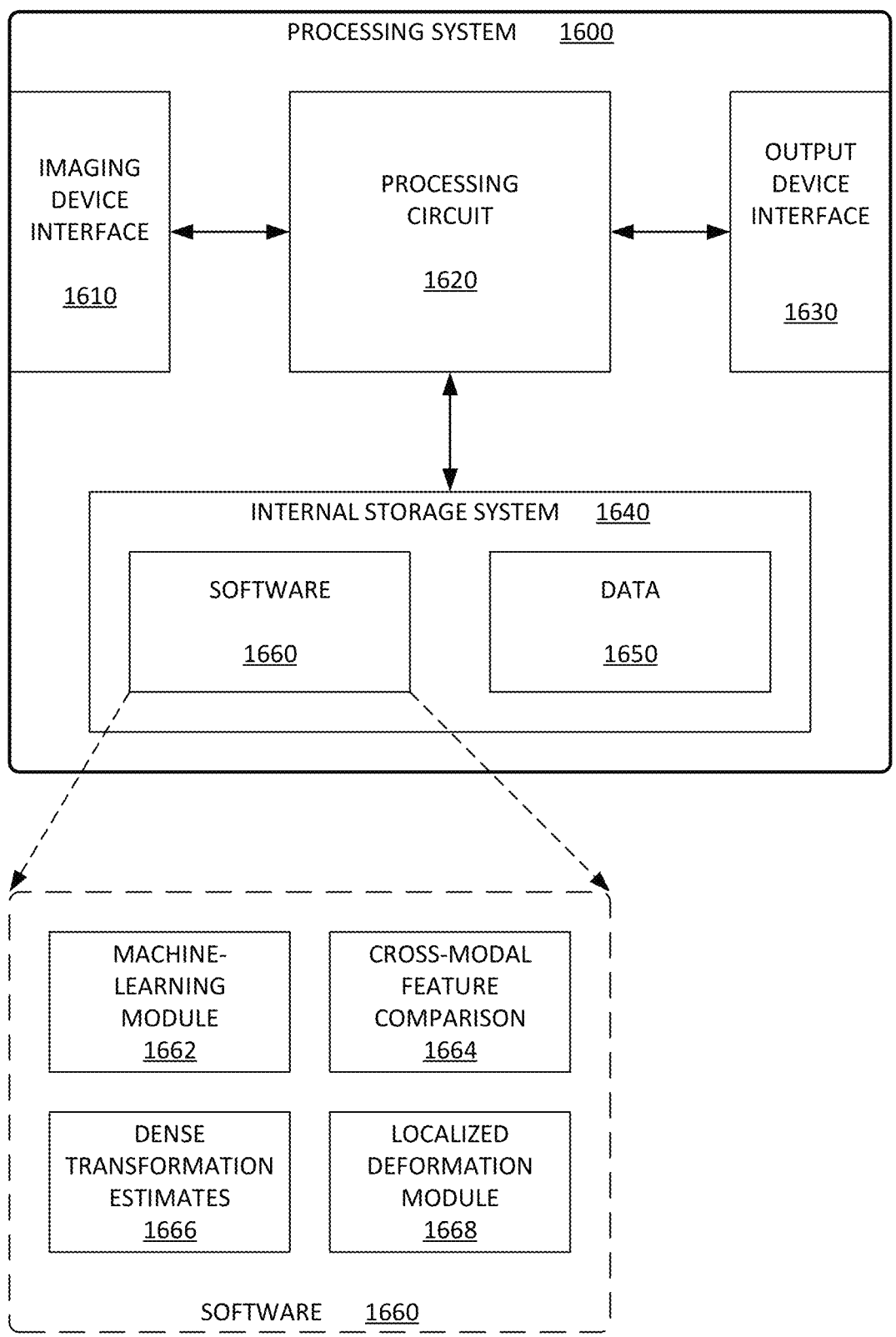
FIG. 16 illustrates a processing system within an image capture system.

FIG. 16 illustrates processing system 1600. As discussed above, processing system 1600 may take on any of a wide variety of configurations. Here, an example configuration is provided for a storage controller implemented as an ASIC. However, in other examples, processing system 1600 may be built into a storage system or storage array, or into a host system.

In this example embodiment, processing system 1600 comprises imaging device interface 1610, processing circuitry 1620, output device interface 1630, and internal storage system 1640. Imaging device interface 1610 comprises circuitry configured to send commands to, and receive data from, various imaging devices, such as 3D image capture device 110 and thermal image capture device 120 from FIG. 1. Output device interface 1630 comprises circuitry configured to send data and commands to various output devices, such as storage system 140 and display device 150 from FIG. 1.

Processing circuitry 1620 comprises electronic circuitry configured to perform the tasks of a storage controller as described above. Processing circuitry 1620 may comprise microprocessors and other circuitry that retrieves and executes software 1660. Processing circuitry 1620 may be embedded in a storage system in some embodiments. Examples of processing circuitry 1620 include general purpose central processing units, application specific processors, and logic devices, as well as any other type of processing device, combinations, or variations thereof. Processing circuitry 1620 can be implemented within a single processing device but can also be distributed across multiple processing devices or sub-systems that cooperate in executing program instructions.

Internal storage system 1640 can comprise any non-transitory computer readable storage media capable of storing software 1660 that is executable by processing circuitry 1620. Internal storage system 1640 can also include various data structures 1650 which comprise one or more databases, tables, lists, or other data structures. Storage system 1640 can include volatile and nonvolatile, removable and non-removable media implemented in any method or technology for storage of information, such as computer readable instructions, data structures, program modules, or other data.

Storage system 1640 can be implemented as a single storage device but can also be implemented across multiple storage devices or sub-systems co-located or distributed relative to each other. Storage system 1640 can comprise additional elements, such as a controller, capable of communicating with processing circuitry 1620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 1660 can be implemented in program instructions and among other functions can, when executed by processing system 1600 in general or processing circuitry 1620 in particular, direct processing system 1600, or processing circuitry 1620, to operate as described herein for an image processing system. Software 1660 can include additional processes, programs, or components, such as operating system software, database software, or application software. Software 1660 can also comprise firmware or some other form of machine-readable processing instructions executable by elements of processing circuitry 1620.

In at least one implementation, the program instructions can include machine-learning module 1662, cross-modal feature comparison module 1664, dense transformation estimates module 1666, and localized deformation module 1668.

Machine-learning module 1662, cross-modal feature comparison module 1664, dense transformation estimates module 1666, and localized deformation module 1668 contain instructions directing processing circuit 1620 to operate according to the methods described herein, particularly with respect to FIGS. 3, 7A, and 7B.

In general, software 1660 can, when loaded into processing circuitry 1620 and executed, transform processing circuitry 1620 overall from a general-purpose computing system into a special-purpose computing system customized to operate as described herein for an image processing system, among other operations. Encoding software 1660 on internal storage system 1640 can transform the physical structure of internal storage system 1640. The specific transformation of the physical structure can depend on various factors in different implementations of this description. Examples of such factors can include, but are not limited to, the technology used to implement the storage media of internal storage system 1640 and whether the computer-storage media are characterized as primary or secondary storage.

For example, if the computer-storage media are implemented as semiconductor-based memory, software 1660 can transform the physical state of the semiconductor memory when the program is encoded therein. For example, software 1660 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. An imaging system, comprising:
   a 3D image capture device, configured to capture a depth image of an object;
   a thermal image capture device, configured to capture a thermal image of the object; and
   a processing system, coupled with the 3D image capture device and the thermal image capture device, configured to process the depth image and the thermal image to produce a thermal-depth fusion image by:
   aligning the thermal image with the depth image using a machine-learning process,
   wherein localized deformation is iteratively applied to dense transformation estimates minimizing deformation error until convergence to produce a geometric transformation of the thermal image to match the depth image; and
   assigning a thermal value derived from the thermal image to a plurality of points of the depth image.

2. The imaging system of claim 1, wherein the machine-learning process includes per-pixel transformations established during an initial training process.

3. The imaging system of claim 1, wherein the depth image is a 3D surface map of the object.

4. The imaging system of claim 1, wherein the object is a human face and the processing system is further configured to:
   compare the thermal-depth fusion image to a plurality of previously captured thermal-depth fusion images;
   determine the closest match from the plurality of previously captured thermal-depth fusion images to the thermal-depth fusion image; and
   based on the closest match, determine an identification of the human face.

5. The imaging system of claim 1, wherein the 3D image capture device comprises two or more thermal image capture devices.

6. The imaging system of claim 1, wherein the 3D image capture device is a time-of-flight sensor.

7. The imaging system of claim 3, wherein the thermal-depth fusion image includes a curvature of the 3D surface map, a normal vector to a surface of the 3D surface map, and a temperature for a plurality of points on the 3D surface map.

8. The imaging system of claim 4, wherein the human face is partially obscured, and the processing system uses a hierarchy of thermal signatures in determining the closest match.

9. The imaging system of claim 4, wherein the processing system is further configured to:
   associate a geometric shape, a surface normal, and a curvature to a thermal distribution with the human face; and
   derive unique authentication signatures of the human face based on a combination of the plurality of previously captured thermal-depth fusion images to extract harmonic thermal-depth signatures comprising relations between curvature, thermal distributions, and facial structure of the human face.

10. The imaging system of claim 9, wherein the processing system is further configured to:
    monitor the changes in the geometric shape, the surface normal, and the principal curvature over time to contribute additional harmonic information to authentication signature of the human face.

11. A method of operating an imaging system, the method comprising:
    receiving a depth image of an object from a 3D image capture device;
    receiving a thermal image of the object from a thermal image capture device;
    aligning the thermal image with the depth image using a machine-learning process,
    wherein localized deformation is iteratively applied to dense transformation estimates minimizing deformation error until convergence to produce a geometric transformation of the thermal image to match the depth image; and producing a thermal-depth fusion image by assigning a thermal value derived from the thermal image to a plurality of points of the depth image.

12. The method of claim 11, wherein the machine-learning process includes per-pixel transformations established during an initial training process.

13. The method of claim 11, wherein the depth image is a 3D surface map of the object.

14. The method of claim 11, wherein the object is a human face and the method further comprising:
comparing the thermal-depth fusion image to a plurality of previously captured thermal-depth fusion images;
determining the closest match from the plurality of previously captured thermal-depth fusion images to the thermal-depth fusion image; and
based on the closest match, determining an identification of the human face.

15. The method of claim 11, wherein the 3D image capture device comprises two or more thermal image capture devices.

16. The method of claim 13, wherein the thermal-depth fusion image includes a curvature of the 3D surface map, a normal vector to a surface of the 3D surface map, and a temperature for a plurality of points on the 3D surface map.

17. The method of claim 14, wherein the human face is partially obscured, and the processing system uses a hierarchy of thermal signatures in determining the closest match.

18. The method of claim 14, further comprising:
associating a geometric shape, a surface normal, and a curvature to a thermal distribution with the human face; and
deriving unique authentication signatures of the human face based on a combination of the plurality of previously captured thermal-depth fusion images to extract harmonic thermal-depth signatures comprising relations between curvature, thermal distributions, and facial structure of the human face.

19. The method of claim 18, further comprising:
monitoring the changes in the geometric shape, the surface normal, and the principal curvature over time to contribute additional harmonic information to authentication signature of the human face.

20. An imaging system, comprising:
a 3D image capture device, configured to capture a depth image of an object;
a thermal image capture device, configured to capture a thermal image of the object; and
a processing system, coupled with the 3D image capture device and the thermal image capture device, configured to process the depth image and the thermal image to produce a thermal-depth fusion image by:
aligning the thermal image with the depth image using a machine-learning process wherein localized deformation is iteratively applied to dense transformation estimates minimizing deformation error until convergence to produce a geometric transformation of the thermal image to match the depth image, wherein the machine-learning process includes per-pixel transformations established during an initial training process; and
assigning a thermal value derived from the thermal image to a plurality of points of the depth image.

* * * * *